US012644495B2

(12) United States Patent
Shula et al.

(10) Patent No.: US 12,644,495 B2
(45) Date of Patent: Jun. 2, 2026

(54) SPLINE ASSEMBLY

(71) Applicant: Honeywell International Inc.,
Charlotte, NC (US)

(72) Inventors: Brian Shula, South Bend, IN (US);
Matthew Spray, Elkhart, IN (US)

(73) Assignee: Honeywell International Inc.,
Charlotte, NC (US)

( * ) Notice: Subject to any disclaimer, the term of this
patent is extended or adjusted under 35
U.S.C. 154(b) by 435 days.

(21) Appl. No.: 18/485,640

(22) Filed: Oct. 12, 2023

(65) Prior Publication Data
US 2025/0122915 A1 Apr. 17, 2025

(51) Int. Cl.
F16D 55/36 (2006.01)
F16D 65/12 (2006.01)
B60T 1/06 (2006.01)
F16D 65/02 (2006.01)

(52) U.S. Cl.
CPC ........... F16D 65/123 (2013.01); F16D 55/36
(2013.01); *B60T 1/065* (2013.01); *F16D*
*2065/1304* (2013.01); *F16D 2065/1368*
(2013.01); *F16D 2250/0084* (2013.01)

(58) Field of Classification Search
CPC ........ F16D 55/025; F16D 55/24; F16D 55/36;
F16D 55/40; F16D 55/44; F16D 55/48;
F16D 2055/0058; F16D 2055/0041; F16D
65/123
See application file for complete search history.

(56) References Cited

U.S. PATENT DOCUMENTS

| | | | | |
|---|---|---|---|---|
| 2,423,011 A | * | 6/1947 | Du Bois | F16D 55/40 |
| | | | | 188/72.2 |
| 3,436,106 A | | 4/1969 | Luenberger | |
| 3,754,624 A | * | 8/1973 | Eldred | F16D 65/84 |
| | | | | 188/264 G |
| 3,915,272 A | * | 10/1975 | Maurice | F16D 13/52 |
| | | | | 188/71.5 |
| 4,383,594 A | | 5/1983 | Correll et al. | |
| 5,186,521 A | * | 2/1993 | Niespodziany | F16D 65/84 |
| | | | | 188/264 G |
| 5,310,025 A | * | 5/1994 | Anderson | F16F 15/12 |
| | | | | 188/73.37 |
| 5,437,352 A | | 8/1995 | Harker | |
| 10,309,468 B2 | | 6/2019 | Cooley | |
| 2022/0356915 A1 | | 11/2022 | Evrard et al. | |

(Continued)

OTHER PUBLICATIONS

Extended Search Report from counterpart European Application
No. 24200781.3 dated Feb. 19, 2025, 9 pp.

(Continued)

*Primary Examiner* — Nicholas J Lane
(74) *Attorney, Agent, or Firm* — Shumaker & Sieffert,
P.A.

(57) ABSTRACT

In some examples, a brake assembly includes a torque tube
supporting at least one spline configured to receive a torque
from one or more stator discs. The spline includes a central
member configured to couple to the torque tube and a load
member configured to receive the torque. The load member
is configured to move relative to the central member from an
unloaded position to a loaded position when the load mem-
ber receives the torque. In examples, the spline includes a
flex member biased to return the load member from the
loaded position to the unloaded position.

20 Claims, 12 Drawing Sheets

(56)                 References Cited

U.S. PATENT DOCUMENTS

2023/0096318 A1*   3/2023   Whittle .................. B64C 25/42
                                             188/1.11 W
2024/0200624 A1*   6/2024   Shula ................... F16D 65/123

OTHER PUBLICATIONS

Response to Extended Search Report dated Feb. 19, 2025, from counterpart European Application No. 24200781.3 filed Apr. 23, 2025, 64 pp.

* cited by examiner

1302

RECEIVING, BY A LOAD MEMBER
OF A SPLINE, A TORQUE FROM A
STATOR DISC OF A BRAKE
ASSEMBLY

1304

MOVING, USING THE SPLINE,
THE LOAD MEMBER RELATIVE
TO A CENTRAL MEMBER OF THE
SPLINE

1306

TRANSFERRING, USING THE
CENTRAL MEMBER, THE
TORQUE TO A TORQUE TUBE

SPLINE ASSEMBLY

TECHNICAL FIELD

The present disclosure relates to brake systems of a vehicle.

BACKGROUND

Vehicles, such as aircrafts, may use a wheel brake assembly that includes a multi-disc brake assembly. For example, the multi-disc brake assembly may include a disc stack comprising a plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may compress the disc stack such that the rotating rotor discs engage the stationary stator discs, producing frictional forces between the rotor discs and the stator discs to decelerate the rotational motion of the wheel. In some examples, the stator discs are configured to engage one or more splines of a stationary torque tube surrounding the axle when the brake assembly compresses the disc stack.

SUMMARY

The present disclosure describes articles, systems, and techniques relating to a brake assembly configured to decelerate a wheel of a vehicle. The brake assembly includes a torque tube supporting one or more splines. The one or more splines are configured to receive torque (e.g., braking torque) from one or more stator discs of the brake assembly during a braking event when the brake assembly decelerates the wheel. At least one spline includes a central member configured to couple to the torque tube and a load member configured to receive the torque. The load member is configured to move relative to the central member when the load member receives the torque.

Movement of the load member relative to the central member may result in less relative displacement between the stator discs and the spline (e.g., a load member of the spline) during compression of the disc stack, potentially reducing frictional forces generated during stator disc translation. The reduction in frictional forces may cause a more consistent transfer of axial force through the stator discs, reducing variations in braking loads among the stator discs (e.g., reducing more load at the stator discs closest to the piston) during compression of a disc stack.

In an example, an assembly comprises: a spline configured to receive a torque from a stator disc of a brake assembly to limit rotational movement of the stator disc around a wheel axis defining an axial direction, the spline comprising: a central member defining a first end, a second end opposite the first end, and a spline axis extending from the first end to the second end, wherein the spline axis extends in the axial direction when the central member is supported by a torque tube of the brake assembly; and a load member configured to receive the torque, wherein the load member is configured to move relative to the central member in a movement direction along the spline axis when the load member receives the torque, and wherein the load member is configured to transfer the torque to the central member.

In an example, an assembly comprises: a disc stack including a plurality of stator discs interleaved with a plurality of rotor discs, wherein the plurality of rotor discs are configured to rotate around a wheel axis defining an axial direction; a torque tube configured to extend through a central aperture defined by the disc stack; an actuator configured to translate at least the plurality of stator discs in the axial direction when the actuator compresses the disc stack, wherein the plurality of stator discs are configured to engage the plurality of rotor discs when the actuator compresses the disc stack; and a spline configured to receive a torque from the plurality of stator discs when the plurality of stator discs engage the plurality of rotor discs, the spline comprising: a central member coupled to body of the torque tube; a load member; and a flex member between the load member and the control member, wherein the load member is configured to receive the torque, wherein the load member is configured to move relative to the central member in the axial direction when the load member receives the torque, wherein the flex member is configured to deform when the load member moves relative to the central member, and wherein the load member is configured to transfer the torque to the central member.

In an example, a method comprises: receiving, by a load member of a spline, a torque from a stator disc of a brake assembly, wherein the spline is configured to limit rotational movement of the stator disc around a wheel axis defining an axial direction, the spline comprising: a central member defining a first end, a second end opposite the first end, and a spline axis extending from the first end to the second end, wherein the spline axis extends in the axial direction, and the load member; moving, using the spline, the load member relative to the central member in a movement direction along the spline axis when the load member receives the torque; and transferring, using the load member, the torque to the central member, wherein the central member is configured to couple to a torque tube of the brake assembly.

The details of one or more examples are set forth in the accompanying drawings and the description below. Other features, objects, and advantages will be apparent from the description and drawings, and from the claims.

DETAILED DESCRIPTION

Figure 1:
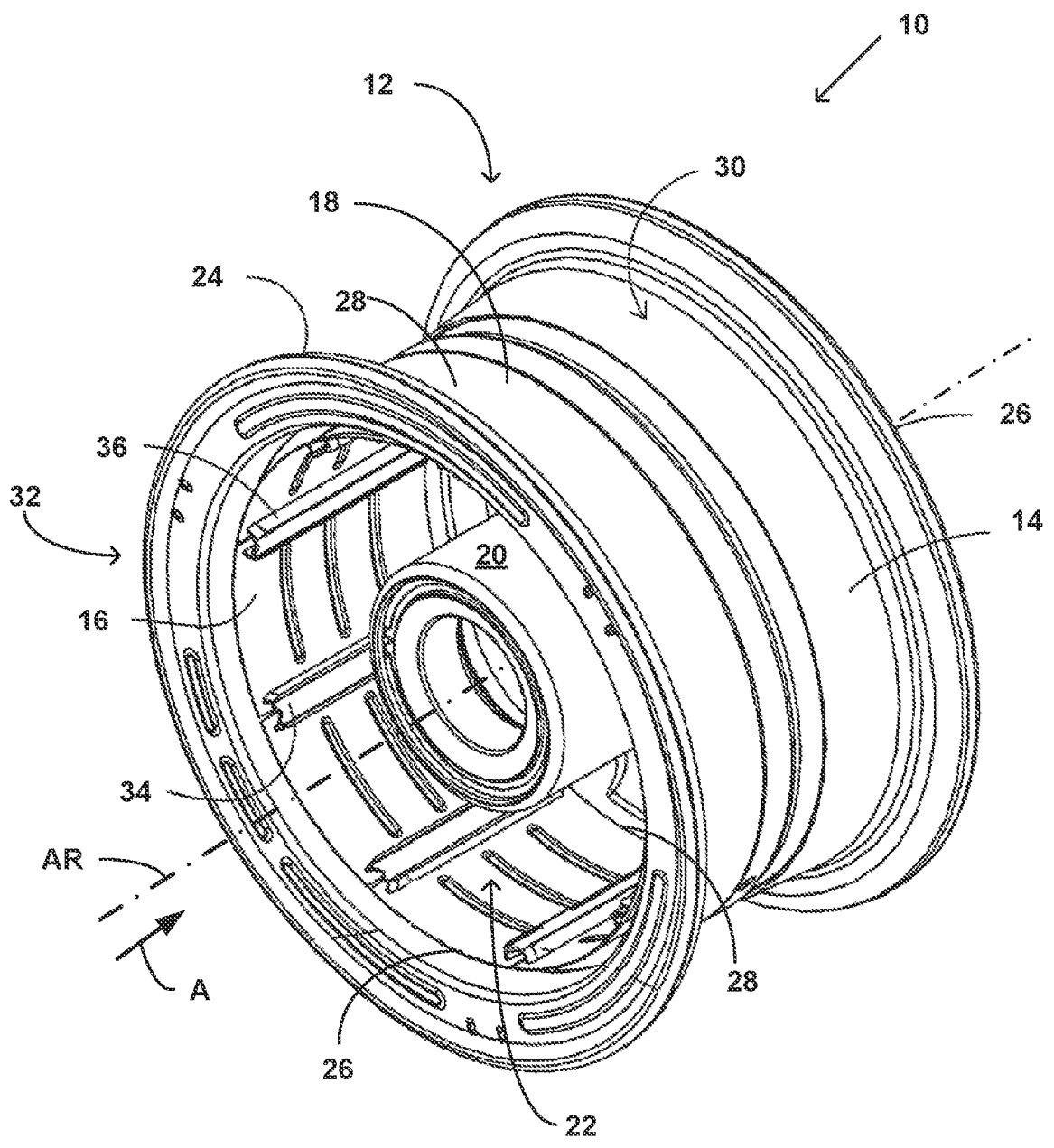
FIG. 1 is a perspective view illustrating an example wheel.

The disclosure describes articles, systems, and techniques relating to a brake assembly configured to decelerate a wheel configured to rotate about a wheel axis. The brake assembly includes a disc stack which includes one or more rotor discs interleaved with one or more stator discs. The rotor discs may be rotationally coupled with the wheel, such that a rotation of the wheel around the wheel axis causes rotation of the rotor discs around the wheel axis. The stator discs may be configured to engage one or more splines supported by a torque tube of the brake assembly, such that the stator discs remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

The disc stack is configured such that the rotor discs are interleaved with the stator discs. The brake assembly is configured such that, in an uncompressed configuration of the disc stack (e.g., when braking is not desired), intervening clearances are generally present between the stator discs and the rotor discs. The intervening clearances substantially prevent and/or limit contact between friction surfaces of the stator discs and the rotor discs, such that the rotor discs rotate freely with the wheel as the stator discs remain substantially stationary. In examples, in the uncompressed configuration, the rotor discs and the wheel rotate relative to a torque tube of the brake assembly as the stator discs remain substantially stationary with respect to the torque tube.

When the disc stack is compressed by an actuator (e.g., during a braking event), the stator discs and rotor discs translate relative to the torque tube (in an axial direction) to close the intervening clearances and cause engagement of the friction surfaces of the stator discs and the friction surfaces of the rotor discs. The engagement generates shearing forces between the stator discs and the rotor discs, causing the rotor discs to exert a torque on the wheel (e.g., via a rotor drive key) which opposes a rotation of the wheel. The shearing forces further generate a braking torque on the stator disc. The braking torque causes the stator disc to contact and impart a torque on a spline supported by (e.g., coupled to or integrally formed with) the torque tube. The spline is configured to transmit the torque to the torque tube and impart a reaction force on the stator disc to counter the braking torque, such that the stator disc remains substantially stationary with respect to the torque tube.

The braking torque produced on a stator disc may be dependent at least in part on a magnitude of axial forces transferred through the stator disc to an adjacent rotor disc. For example, the shearing forces causing the braking torque may be dependent on a coefficient of static friction or coefficient of kinetic friction between the stator disc and the adjacent rotor disc and the magnitude of axial forces transferred. Hence, variations in the magnitude of the axial force transferred through the stator disc may cause variation in the braking torque developed by the stator disc.

For example, a disc stack of a brake assembly may include a first stator disc positioned between a first adjacent rotor disc and a second adjacent rotor disc. The brake assembly includes an actuator configured to impart an actuator force to the first adjacent rotor disc (e.g., via a pressure plate) to compress the disc stack. The actuator force can also be referred to as an axial compressive force or an axial force. The first stator disc is configured to receive at least some portion of the actuator force from the first adjacent rotor disc and establish a sliding contact with the spline (e.g., caused by the braking torque) as the first stator disc translates in the axial direction, resulting in a frictional resistance force which must be overcome by the actuator during the compression of the brake disc stack. This frictional resistance may cause the first stator disc to transfer a lesser portion of the actuator force to the second adjacent rotor disc as compared to the portion of the actuator force the first stator disc received from the first rotor disc.

Similar resistance frictional forces may arise as the second adjacent rotor disc transfers the lesser portion of the actuator force to the remainder of the disc stack, such that other stator discs in the disc stack experience a continued decrease in the magnitude of axial force transferred. For example, the disc stack may include a second stator disc displaced from the first stator disc in a direction of the actuator force (that is, the second stator disc is further from the actuator than the first stator disc), and a third stator disc displaced from the second stator disc in the direction of the actuator force (that is, the third stator disc is further from the actuator than the second stator disc). The frictional forces which arise from the sliding contact of the first stator disc, the second stator disc, and the third stator disc may cause the second stator disc to transfer less axial force to the third stator disc than that transferred by the first stator disc to the second stator disc, and/or cause the third stator disc to transfer less axial force to an adjacent disc than that transferred from the second disc to the third disc. Thus, due at least in part to the variation in the magnitude of the axial forces transferred, the second stator disc may develop a braking torque less than the first stator disc, and/or the third stator disc may develop a braking torque less than the second stator disc. This variation in the braking torques developed may cause an uneven distribution of the braking load among the first stator disc, the second stator disc, the third stator disc, and/or other stator discs of the disc stack.

The variation in braking torque may cause excessive front end loading in the disc stack. For example, a stator disc closer to the actuator (e.g., the first stator disc) may transfer greater axial force (e.g., experience more compressive load) than stator discs displaced in the axial direction farther from the actuator. The greater compressive load may cause the closer stator disc to carry more braking load than the farther stator discs, potentially causing increased wear of the closer stator disc relative to the farther stator discs during a braking operation. Further, the increased braking load may generate higher temperatures in the closer stator disc relative to the farther stator discs, potentially increasing a rate of wear and/or increasing an oxidation of materials comprising the closer stator disc as compared to the farther stator discs.

The brake assemblies disclosed herein include a spline configured to reduce variations in the axial forces experienced by stator discs of a disc stack. The spline comprises a central member configured to be supported by the torque tube (e.g., separate from and coupled to the torque tube or integrally formed with the torque tube) and a load member coupled to the central member and configured to receive a torque (e.g., a braking torque) from one or more of the stator discs. The load member is configured to move relative to the central member when the load member receives the torque.

In examples, the load member is configured to move in the direction of translation of the stator discs. Additionally, the load member is configured to transfer the torque to the central member. The central member is configured to transfer the torque to the torque tube.

Movement of the load member when the load member receives the torque from one or more of the stator discs may result in less relative displacement between the stator discs and the spline (e.g., a load member of the spline) during compression of the disc stack. The reduced relative displacement may reduce a magnitude of frictional forces generated by stator discs as the stator discs translate during disc stack compression, causing a more consistent transfer of axial force through the disc stack. The more consistent transfer may reduce variations in braking load carried by individual stator discs during compression of the disc stack during a braking event. In some examples, the load member is configured such that movement of the load member in the direction of the stator disc translation substantially eliminates all relative displacement between a stator disc and the load member.

Reduction and/or substantial elimination of variations in braking torque among the stator discs may reduce and/or substantially eliminate excessive front end loading in the disc stack, such that stator discs throughout the disc stack carry a more even braking load. This may reduce and/or substantially eliminate increases in wear of stator discs (e.g., one or more inboard stator discs) which may be closer to the actuator than other stator discs (e.g., one or more outboard stator discs) in the disc stack. The reduction and/or substantially elimination of variations in the braking torque may reduce and/or substantially eliminate variations in temperature experienced among the stator discs, limiting variations in rate of wear and/or oxidation that might occur among the stator discs. More even wear of the brake discs of a braking assembly may help reduce the possibility that the brake discs will need to be replaced earlier than expected, e.g., due to the premature wear of one or fewer than all the stators. The movement of the load member relative to the central member may also reduce stress peaking factors during braking between the spline and a stator disc.

In examples, the load member is configured to establish an unloaded position relative to the central member and a loaded position relative to the central member. The load member is configured to transition from the unloaded position to the loaded position when the load member receives a torque from one or more stator discs and transfers the torque to the central member. The load member is configured to return to the unloaded position when load member ceases to transfer the torque to the central member (e.g., when the load member ceases to receive the torque from the stator discs). In examples, the load member displaces in the direction of the translation of the stator discs when transitioning from the unloaded position to the loaded position. Displacement in the direction of the stator disc translation may reduce relative displacement between the stator discs and the load member as the stator discs translate, reducing a magnitude of frictional forces generated by the stator disc translation.

In some examples, the spline includes a flex member extending from the central member to the load member. The flex member is configured to substantially deform (e.g., compress and/or bend) in a manner that enables the load member to move relative to the central member when the load member receives a torque from the stator discs. In some examples, the flex member is resiliently biased to return the load member to the unloaded position when the load member ceases to receive the torque from the stator discs (e.g., at the conclusion of a braking event, such as when the actuator ceases to compress the disc stack). In some examples, the flex member is a substantially elastic member configured to deform from an initial shape to a loaded shape when the load member receives the torque, and configured to substantially return to the unloaded shape when the load member ceases to receive the torque. The flex member may be configured to return the load member to the unloaded position when the flex member substantially returns to the unloaded shape.

In some examples, the load member is configured to move toward the central member when the load member moves relative to the central member in the axial direction. For example, the load member may be configured to substantially place the flex member in compression between the load member and the central member when load member receives the torque from one or more stator discs. The compression may cause deformation and/or bending of the flex member, such that the load member moves toward the central member as the load member moves relative to the central member in the axial direction.

In some examples, the spline comprises a plurality of load members such that, for example, a first stator disc imparts its braking torque to a first load member and a second stator disc imparts its braking torque to a second load member. In examples, the first load member, the second load member, and/or other load members of the spline may be separated from adjacent load members by displacements in the axial direction. In some examples, the spline may be configured such that first load member and the second load member move relative to the central member by different amounts when the spline receives a torque from the first stator disc and the second stator disc. For example, the spline may be configured to allow the first load member to displace relative to the central member by a first displacement when the first load member receives a torque from the first stator disc. The spline may be configured to allow the second load member to displace relative to the central member by a second displacement different from the first displacement when the second load member receives a torque from the second stator disc. The differing displacements may accommodate a difference in translations undergone by the first stator disc and the second stator disc when the disc stack is compressed.

For example, the brake assembly may be configured to compress the disc stack in an axial direction (e.g., an outboard direction) from a pressure plate to a backing plate. The second stator disc may be separated from the first stator disc by other discs in the disc stack (e.g., one or more rotor discs and/or one or more other stator discs), such that the second stator disc is displaced from the first stator disc in the axial direction. Hence, when the disc stack is compressed, the first stator disc may be required to translate relative to the torque tube by an first amount sufficient to overcome the intervening clearances present between the other discs, as well as additional intervening clearances between discs that may be further displaced from the second stator in the axial direction. In contrast, the second stator disc may only be required to translate relative to the torque tube by an second amount sufficient to overcome the additional intervening clearances between discs further displaced from the second stator in the axial direction. Hence, the first stator disc may be required to translate relative to the torque tube over a displacement greater than the translation required by the second stator disc when the disc stack is compressed.

A spline configured such that a first load member may translate over a first displacement and a second load member may translate over a second displacement different from the first displacement may accommodate the differing translations undergone by the first stator disc and the second stator disc when the disc stack is compressed. This may limit and/or reduce relative displacement between the first stator disc and the spline that might otherwise be required to compress the disc stack in the absence of the first load member and the second load member. This reduction in the relative displacement may reduce the frictional force generated as the first stator disc translates relative to the torque tube during disc stack compression, causing a more consistent transfer of axial force through the disc stack. In examples, the spline includes a plurality of flex members, and each load member is coupled to the central member by a separate flex member. For example, the first load member may be coupled to the central member by a first flex member and the second load member may be coupled to the central member by a second flex member.

In some examples, a first load member is configured to cause a second load member to displace toward the central member when the first load member displaces toward the central member. This may mitigate and/or eliminate interferences to stator disc translation that might arise when the first load member receives torque from the stator discs and displaces toward the central member. The first load member may be configured to drive the second load member toward the central member (e.g., in a direction substantially orthogonal to the axial direction) such that a stator disc experiences a relatively smooth travel path as the stator disc translates from the first load member to the second load member. For example, the second load member may be displaced from the first load member in the direction of stator disc translation, and also immediately adjacent to the first load member such that no other load members of the spline separate the first load member and the second load member. The first load member (e.g., an end portion of the first load member) may be configured to substantially trap the second load member (e.g., an end portion of the second load member) such that the first load member substantially drives the second load member toward the central member as the first load member displaces toward the central member. In examples, the end portion of the first load member is configured to substantially overhang the end portion of the second load member.

In examples, the spline is supported by a key coupled to at least one end of the spline and the torque tube. The key may remove a necessity for a spline fillet between the spline and the torque tube (e.g., the torque tube barrel). This may allow an inner diameter of a stator disc to position closer to the torque tube barrel, allowing for increased carbon mass in the stator disc (e.g., increased carbon material within the heat sink) without increasing an outer diameter of the stator disc. Further, elimination of the fillet may allow carbon engagement with the spline to occur closer to the torque tube barrel.

Hence, the brake assembly includes a spline comprising a central member configured to be supported by the torque tube and a load member configured to receive a torque from one or more stator discs. The load member is configured to move relative to the central member (e.g., move in the direction of stator disc translation) when the load member receives the torque. Movement of the load member relative to the central member may result in less relative displacement between the stator discs and the spline (e.g., a load member of the spline) during compression of the disc stack, potentially reducing frictional forces generated during stator disc translation and causing a more consistent transfer of axial force through the disc stack. The load member is configured to transfer the torque to the central member. The central member is configured to transfer the torque to the torque tube.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of wheel rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 may be configured to rotate around an axis of rotation AR ("axis AR"). An axial direction A of wheel 10 may be substantially parallel to axis AR (e.g., parallel or nearly parallel to the extent permitted by manufacturing tolerances) and has a direction from inboard section 28 toward outboard section 30. In examples, the axial direction A is an outboard direction of wheel 10 and a direction opposite axial direction A is an inboard direction of wheel 10.

Wheel 10 includes a plurality of rotor drive keys 32 ("rotor drive keys 32") on interior surface 16 of wheel 10, such as rotor drive key 34 and rotor drive key 36. In some examples, each rotor drive key of the plurality of rotor drive keys 32 protrudes from interior surface 16 and extends in a substantially axial direction of wheel 10 (e.g., in a direction parallel to axis AR). Rotor drive keys 32 and interior surface 16 are configured to be substantially stationary with respect to each other, such that when wheel 10 (and interior surface 16) rotates around axis AR, each of rotor drive keys 32 (e.g., rotor drive keys 34, 36) translates over a closed path around axis A. Consequently, when wheel 10, interior surface 16, and rotor drive keys 32 are rotating around axis AR, a force on one or more of rotor drive keys 32 opposing the direction of rotation acts to slow or cease the rotation. As will be discussed, rotor drive keys 32 may be configured to receive a torque from a braking system (not shown) configured to reduce and/or cease a rotation of wheel 10. Rotor drive keys 32 may be integrally formed with interior surface 16, or may be separate from and mechanically affixed to interior surface 16.

Figure 2:
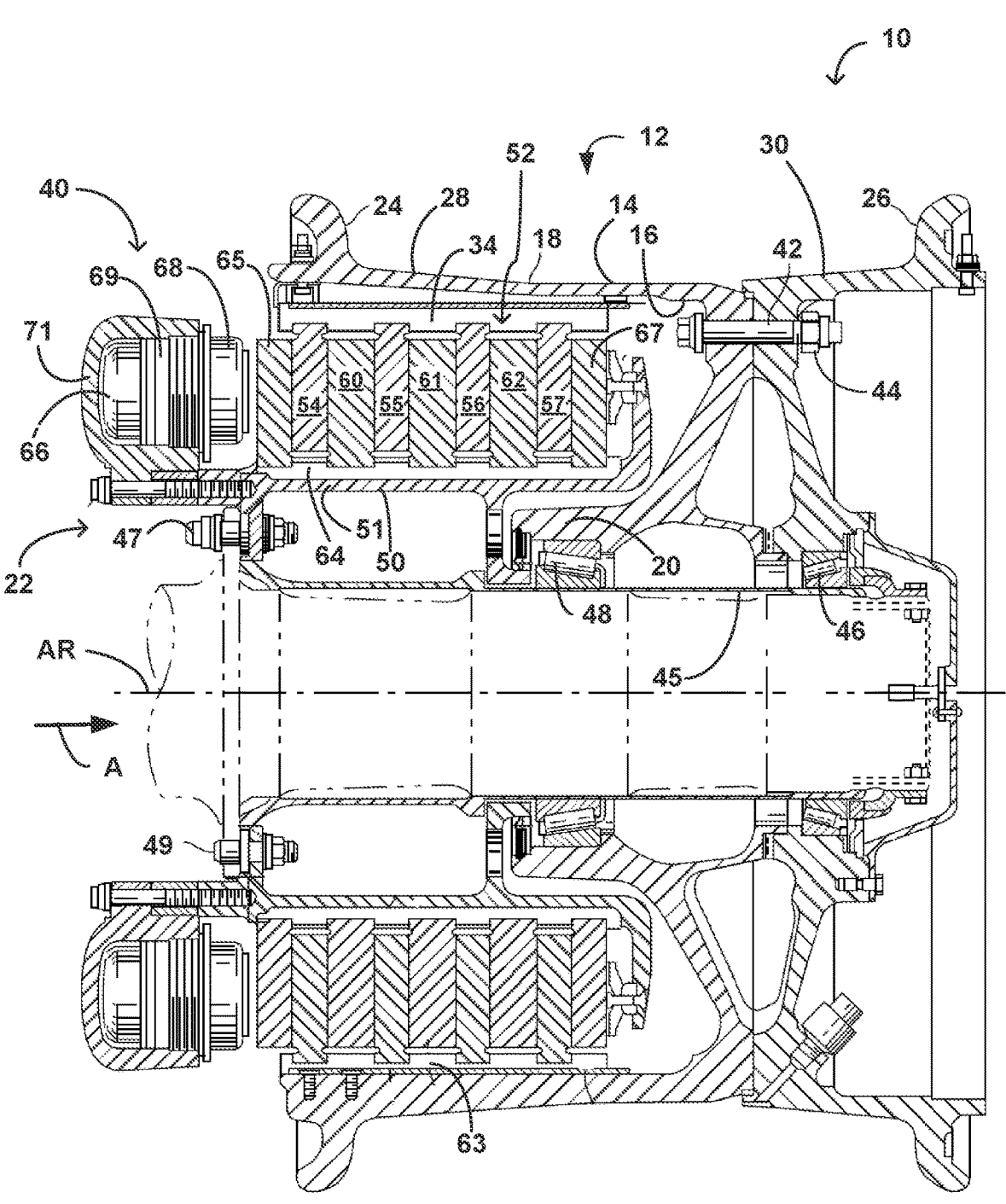
FIG. 2 is a schematic cross-sectional view illustrating an example wheel and brake assembly including the wheel of FIG. 1, the cross-section being taken in a direction parallel to a wheel axis.
Figure 3:
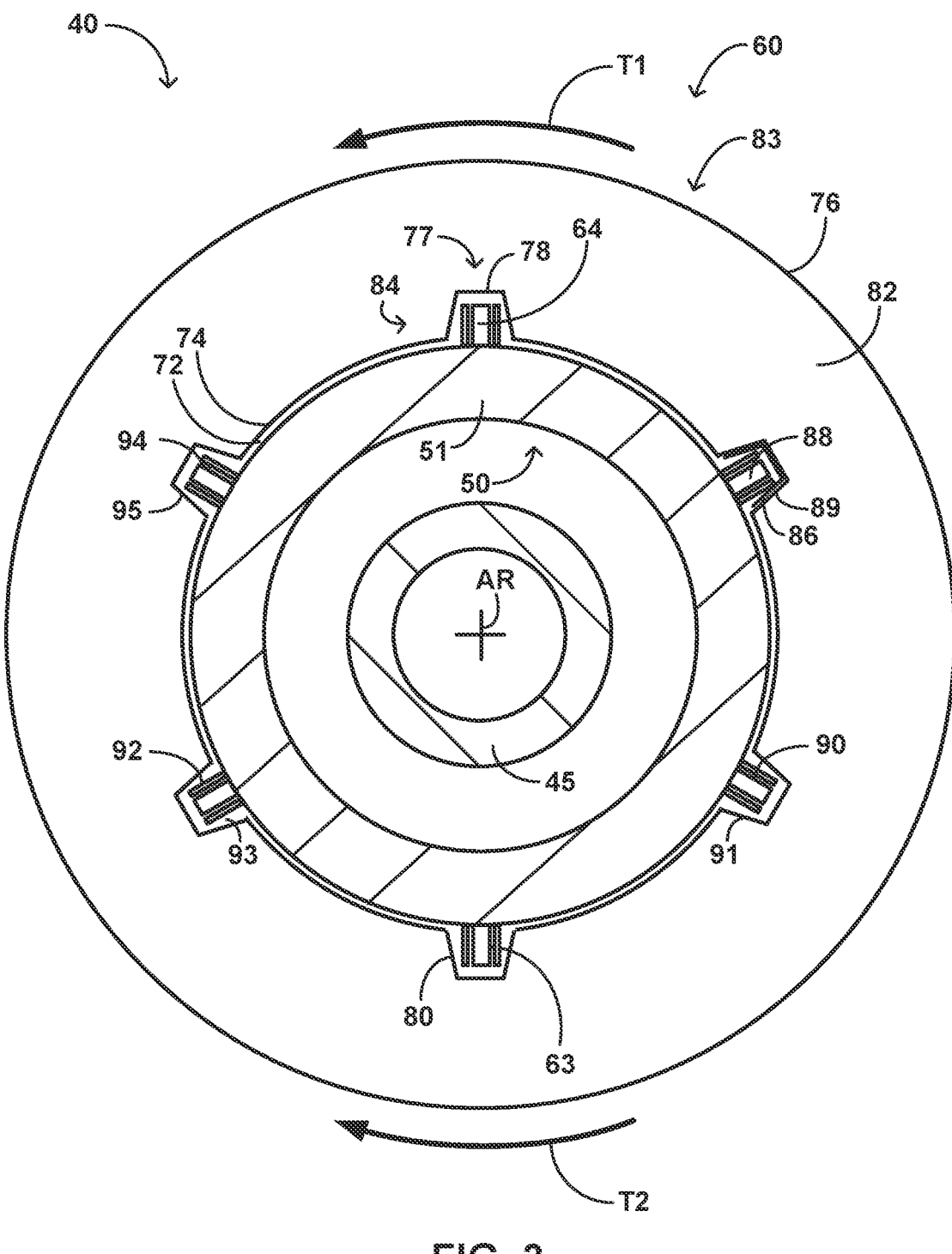
FIG. 3 is a cross-sectional schematic view illustrating an example stator disc and a torque tube, the cross-section being taken in a direction orthogonal to a wheel axis.

FIG. 2 is a schematic cross-sectional view illustrating wheel 10 and an example brake assembly 40, with the cross-section taken in a plane which includes axis AR. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 3 is a schematic cross-sectional view illustrating a portion of brake assembly 40 and wheel 10. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples.

Wheel 10 is configured to rotate about axis AR extending through an axial assembly 45. Axial assembly 45 is configured to support wheel 10 while allowing wheel 10 to rotate around axis AR using a bearing 46 and a bearing 48. In some examples, axial assembly 45 supports and/or houses electrical, pneumatic, hydraulic, and/or other connections and/or sensors (e.g., wheel speed sensors) required for the operation of one or more components of brake assembly 40. For example, bearings 46, 48 may define a substantially circular track around axial assembly 45. A torque tube 50 may be coupled to axial assembly 45. Torque tube 50 is configured such that a body 51 of torque tube 50 ("torque tube body 51") is substantially rotationally stationary relative to wheel 10 when wheel 10 rotates around axial assembly 45, torque tube 50, and/or axis A. Torque tube 50 may at least partially surround axis A. In examples, axial assembly 45 is configured to mechanically couple to a strut attached to a vehicle (e.g., a landing gear strut).

In the example shown in FIG. 2, brake assembly 40 is positioned within wheel 10 (e.g., positioned within wheel cavity 22) and configured to engage rotor drive key 34 (or a plurality of rotor drive keys). Brake assembly 40 is configured to generate a torque to oppose a rotation of wheel 10 around axis AR and transfer the torque to rotor drive key 34, reducing and/or eliminating the rotation of wheel 10 around axis A. Brake assembly 40 includes a disc stack 52 which includes one or more rotor discs (e.g., rotor discs 54, 55, 56, 57) and one or more stator discs (e.g., stator discs 60, 61, 62). Rotor discs 54, 55, 56, 57, and/or stator discs 60, 61, 62 may have any suitable configuration. For example, rotor discs 54, 55, 56, 57 and/or stator discs 60, 61, 62 can each be substantially annular discs surrounding axial assembly 45. In examples, torque tube 50 is configured to extend through one or more apertures defined by one or more of rotor discs 54, 55, 56, 57 and/or one or more of stator discs 60, 61, 62. In some examples, each of rotor discs 54, 55, 56, 57 and each of stator discs 60, 61, 62 respectively define an aperture (e.g., a central aperture) defined by an inner perimeter of the respective disc. Torque tube 50 may be configured to extend through each of the defined apertures. In examples, torque tube 50 is configured to extend through the one or more apertures substantially in the axial direction A.

Rotor discs 54, 55, 56, 57 are configured to rotationally couple (e.g., using one or more rotor drive slots) to at least one rotor drive key (e.g., rotor drive key 34) and interior surface 16 to rotate substantially synchronously with wheel 10 around axis A. Stator discs 60, 61, 62 are configured to rotationally couple to torque tube 50 and at least a spline 64 (e.g., using one or more stator slots) to remain substantially stationary with wheel 10 as wheel 10 rotates around axis A. Spline 64 may be configured to substantially arrest a rotation of stator discs 60, 61, 62 to cause stator discs 60, 61, 62 to remain substantially rotationally stationary with respect to torque tube 50 (and, e.g., axial assembly 45) as wheel 10 and rotor discs 54, 55, 56, 57 rotate. For examples, spline 64 may arrest the rotation such that stator discs 60, 61, 62 rotate less than 5 degrees with respect to torque tube body 51 in some examples, such as less than 1 degree with respect to torque tube body 51 in some examples. In some examples, spline 64 extends outward (e.g., radially outward) from torque tube body 51 in a radial direction away from axis AR. Spline 64 is configured to extend in a substantially axial direction of wheel 10 (e.g., in a direction parallel to axis AR or nearly parallel to the extent permitted by manufacturing tolerances).

FIG. 3 is a schematic cross-sectional view illustrating torque tube 50 extending through an aperture 72 defined by and extending through stator disc 60, with the cross-section taken perpendicular to axis AR. The description of stator disc 60 is applicable to the other stator discs of brake assembly 40. Stator disc 60 includes an inner perimeter 74 configured to surround axis AR. In examples, inner perimeter 74 defines aperture 72. Stator disc 60 includes an outer perimeter 76 configured to surround inner perimeter 74. Stator disc 60 further defines a plurality of stator slots 77 ("stator slots 77") around inner perimeter 74, such as first stator slot 78 and second stator slot 80, as well as others similarly depicted. Stator disc 60 further includes friction surface 82 between inner perimeter 74 and outer perimeter 76. Stator disc 60 may include a second friction surface 83 opposite friction surface 82. Friction surface 82 and the second friction surface of stator disc 60 are configured to engage with adjacent rotor discs (e.g., at least one of rotor discs 54, 55 (FIG. 2)) during a braking operation of brake assembly 40.

In the example shown in FIG. 3, aperture 72 is configured to surround torque tube 50. In examples, aperture 72 is configured to receive torque tube 50 when torque tube 50 surrounds some portion of axial assembly 45. Stator slots 77 such as stator slot 78, 80 are configured to slidably receive a plurality of splines 84 ("splines 84") supported by torque tube 50, such as spline 63, spline 64, and others. In examples, stator disc 60 may include one or more stator inserts such as stator insert 86 configured to slidably engage a spline such as spline 88 when stator slots 77 slidably engage splines 84. Stator insert 86 may be configured to reduce and/or limit stresses imparted to stator disc 60 by spline 88, such as stresses imparted to a disc material (e.g., a carbon material and/or carbon-composite material) comprising stator disc 60. Stator disc 60 may define additional stator slots on inner perimeter 74, such as stator slot 89, stator slot 91, stator slot 93, and/or stator slot 95.

Torque tube body 51 is configured to support splines 84 such that at least some portion of splines 84 are substantially stationary (e.g., stationary or nearly stationary) with respect to torque tube body 51 (e.g., when wheel 10 rotates around axis A). Splines 84 may include additional splines, such as spline 90, spline 92, and/or spline 94. Splines 84 are configured to extend through stator slots 77 such that stator disc 60 can translate relative to torque tube body 51 along splines 84. In examples, splines 84 are be configured to allow stator disc 60 to translate in an axial direction substantially parallel (e.g., parallel or nearly parallel to the extent permitted by manufacturing tolerances) to axis AR. In examples, one or more of splines 84 is a unitary (e.g., substantially contiguous) component with torque tube body 51. In some examples, one or more of splines 84 are physically separate from and then affixed to torque tube body by welding, soldering, fasteners, adhesives, or other fixation methods.

Figure 4:
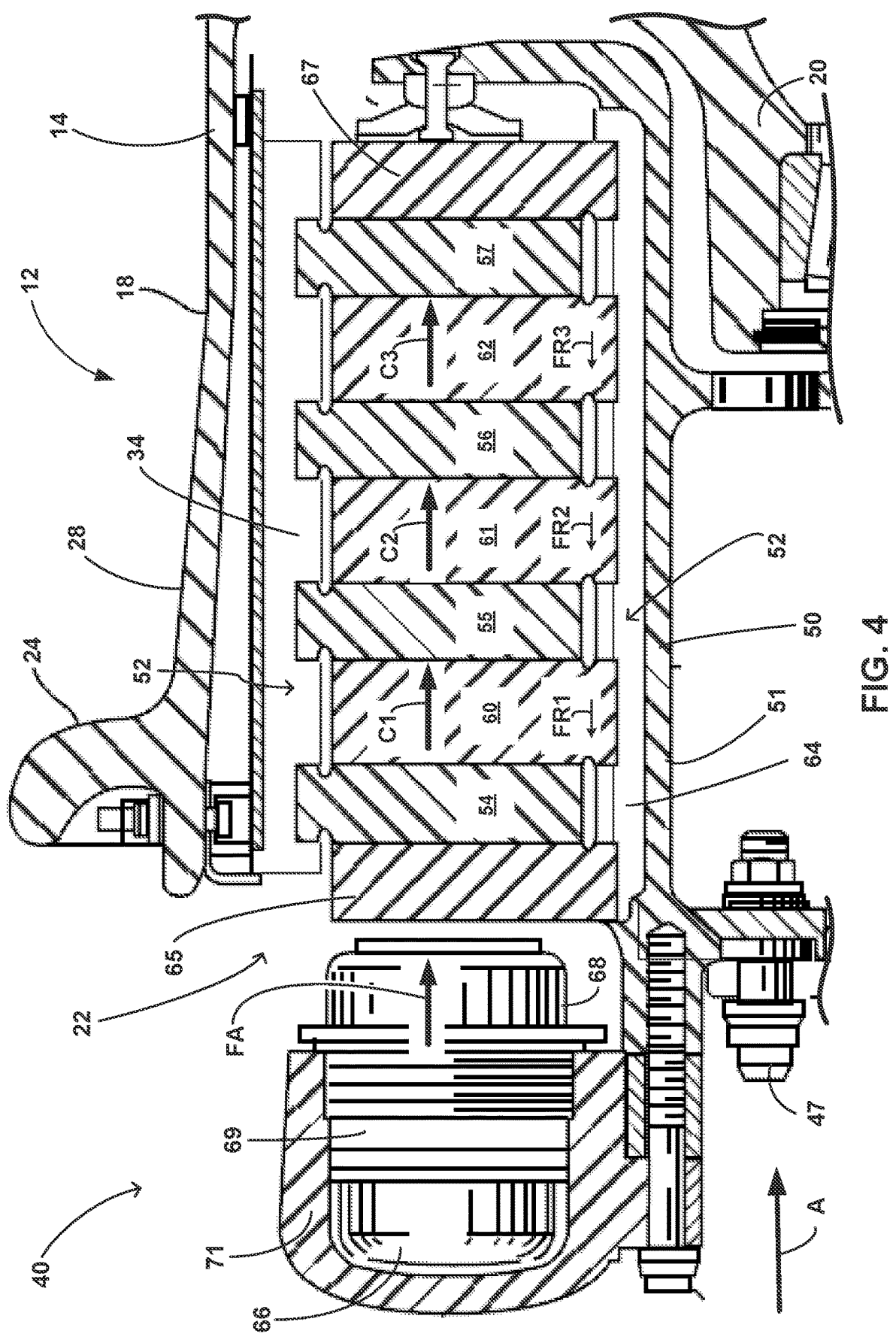
FIG. 4 is a schematic cross-sectional view illustrating a brake disc stack and an actuator, the cross-section being taken in a direction parallel to a wheel axis.

FIG. 4 is a schematic cross-sectional view illustrating a portion of brake assembly 40, with the cross-section taken in a plane which includes axis AR. In the example shown in FIG. 4, brake assembly 40 includes an actuator 66 configured to compress disc stack 52 to, for example, cause a deceleration of wheel 10. In examples, actuator 66 is configured to cause the compression of disc stack 52 between a pressure plate 65 and a backing plate 67. Disc stack 52 is configured such that, in the absence of compression by actuator 66, an intervening clearance (e.g., a gap) is present between a given stator disc (e.g., stator disc 60) and any neighboring, immediately adjacent rotor discs (e.g., rotor disc 54 and/or rotor disc 55). The intervening clearance substantially prevents and/or limits contact between friction surfaces of the stator disc and friction surfaces of the adjacent rotor discs, such that the adjacent rotor discs rotate substantially freely with respect to the stator disc as wheel 10 rotates. When actuator 66 acts to compress disc stack 52 (e.g., when braking of wheel 10 is desired), the compression causes a translation of the stator disc and/or the adjacent rotor discs which acts to close the intervening clearance between the discs, causing contact between the friction surfaces of the stator disc (e.g., friction surface 82, second friction surface 83, friction surface 75 (FIG. 8)) and the friction surfaces of the adjacent rotor discs (e.g., friction surface 110, friction surface 112, second friction surface 73 (FIG. 8)). The contact may cause shearing forces to generate between the discs, causing deceleration of wheel 10.

For example, when actuator 66 compresses disc stack 52, one or more of rotor discs 54, 55, 56, 57 and one or more of stator discs 60, 61, 62 translate in the axial direction A to substantially close intervening clearances in disc stack 52, causing contact and the generation of shearing forces among rotor discs 54, 55, 56, 57 and stator discs 60, 61, 62. The shearing forces cause rotor discs 54, 55, 56, 57 to exert a torque on rotor drive key 34 opposing a rotation of wheel 10. The shearing forces further generate a braking torque (e.g., one of torque T1 or torque T2) on each of stator discs 60, 61, 62 around torque tube 50 and/or axis A. The braking torques generated cause stator discs 60, 61, 62 to contact and impart a torque (e.g., a torque around axis A) on spline 64 and/or one or other splines of brake assembly 40. Spline 64 is configured to transmit the torque to torque tube 50 (e.g., torque tube body 51) and impart a reaction force on stator discs 60, 61, 62 countering the braking torque, such that stator discs 60, 61, 62 remain substantially stationary with respect to torque tube 50.

The braking torque produced on an individual stator disc (e.g., one of stator discs 60, 61, 62) when actuator 66 compresses disc stack 52 may be dependent at least in part on a magnitude of forces in the axial direction A experienced by the individual stator disc. For example, actuator 66 may impart an actuator force FA on disc stack 52 (e.g., via pressure plate 65) to cause compression of disc stack 52. In response to actuator force FA, rotor discs 54, 55, 56, 57 and/or stator discs 60, 61, 62 may translate in axial direction A to substantially close intervening clearances within disc stack 52 and cause at least some portion of actuator force FA to transfer through disc stack 52 from pressure plate 65 to backing plate 67.

As an example, rotor disc 54 may impart at least some portion of actuator force FA to stator disc 60, causing stator disc 60 to impart a force C1 to rotor disc 55. Force C1 may act as a contact force in the axial direction A between a friction surface on stator disc 60 and a friction surface on rotor disc 55. Hence, the braking torque generated by stator disc 60 may be dependent on a magnitude of force C1. Rotor disc 55 may impart at least some portion of force C1 to stator disc 61, causing stator disc 61 to impart a force C2 to rotor disc 56. Force C2 may act as a contact force in the axial direction A between a friction surface on stator disc 61 and a friction surface on rotor disc 56, such that the braking torque generated by stator disc 61 depends on a magnitude of force C2. Rotor disc 56 may impart at least some portion of force C2 to stator disc 62, causing stator disc 62 to impart a force C3 to rotor disc 57. The force C3 may act as a contact force in the axial direction A between a friction surface on stator disc 62 and a friction surface on rotor disc 57, such that the braking torque generated by stator disc 62 depends on a magnitude of force C3. Thus, variations in the magnitudes of force C1, force C2, and/or force C3 may produce variation in the braking torques developed by stator disc 60, stator disc 61, and/or stator disc 62.

In some braking systems, variations in the magnitudes of force C1, force C2, and/or force C3 may arise as a result of one or more drag forces that must be overcome to translate one or more of stator discs 60, 61, 62 towards backing plate 67, as disc stack 52 is compressed. For example, stator discs 60, 61, 62 may be configured to establish a sliding contact with spline 64 as stator discs 60, 61, 62 translate in axial direction A, resulting in a frictional resistance which must be overcome by actuator 66 during the compression. The frictional resistances may decrease the magnitude of axial force experienced by respective discs in disc stack 52 as the axial force is transferred from pressure plate 65 to backing plate 57 such that, for example, force C1 is greater than force C2, and force C2 is greater than force C3.

For example, during compression of disc stack 52 by actuator 66 (e.g., during an initial phase of a compression, and/or during an increase in actuator force FA), actuator 66 may be required to cause an axial translation (e.g., translation in axial direction A) of stator disc 60 as stator disc 60 experiences braking torque and establishes and/or maintains contact with spline 64. The transfer of the braking torque from stator disc 60 to spline 64 as stator disc 60 slides along spline 64 to translate in axial direction A may generate a frictional force FR1 opposing the translation. Frictional force FR1 may cause force C1 imparted by stator disc 60 to be less than the portion of actuator force FA imparted to stator disc 60 by rotor disc 54. Similarly, a frictional force FR2 arising between stator disc 61 and spline 64 as stator disc 61 slides along spline 64 may cause force C2 imparted by stator disc 61 to be less than the portion of force C1 imparted to stator disc 60 by rotor disc 55. A frictional force FR3 arising between stator disc 62 and spline 64 as stator disc 62 slides along spline 64 may cause force C3 imparted by stator disc 62 to be less than the portion of force C2 imparted to stator disc 62 by rotor disc 56. Hence, variations in the magnitudes of force C1, force C2, and/or force C3 may arise during some compressions of disc stack 52, resulting in variation in the braking torques developed by stator disc 60, stator disc 61, and/or stator disc 62. The variations may result in some stator discs in disc stack 52 (e.g., inboard stator discs such as stator disc 60) carrying a greater braking load than outboard discs of disc stack 52 (e.g., stator disc 61 and/or stator discs 62).

Spline 64 is configured to reduce variations in the axial forces experienced by stator discs 60, 61, 62 and/or rotor discs 54, 55, 56, 57 when actuator 66 compresses disc stack 52. Spline 64 comprises a central member configured to be supported by torque tube 50. The central member defines a spline axis extending in axial direction A when torque tube 50 supports spline 64. Spline 64 further comprises a load member configured to receive a torque (e.g., a braking torque) from one or more of stator discs 60, 61, 62. The load member is configured to move in the axial direction A relative to the central member when the load member receives the torque. Additionally, the load member is configured to transfer the torque to the central member, which may transfer the torque to torque tube 50.

In examples, the load member is configured to transition from an unloaded position relative to the central member to a loaded position relative to the central member when the load member transfers the torque to the central member (e.g., when the load member receives the torque from stator discs 60, 61, 62). The load member may be configured to return to the unloaded position when load member ceases to transfer the torque to the central member (e.g., when the load member ceases to receive the torque from stator discs 60, 61, 62).

Movement of the load member in the axial direction A when the load member receives the torque from one or more of stator discs 60, 61, 62 may result in less relative displacement between stator discs 60, 61, 62 and spline 64 (e.g., the load member) during compression of disc stack 52. The reduced relative displacement may reduce a magnitude of frictional forces generated during a translation of stator discs 60, 61, 62, resulting in a more consistent transfer of actuator force FA through disc stack 52. For example, movement of the load member may reduce the magnitudes of frictional force FR1, frictional force FR2, and/or frictional force FR3. Reducing the magnitudes of frictional force FR1, frictional force FR2, and/or frictional force FR3 may reduce variations in the magnitudes of force C1, force C2, and/or force C3, such that actuator force FA is transferred more consistently through disc stack 52. The more consistent transfer may reduce variations in braking load carried by individual stator discs during compression of disc stack 52.

For example, the more consistent transfer of actuator force FA may reduce and/or substantially eliminate excessive front end loading in disc stack 52, such that stator discs 60, 61, 62 carry a more even braking load. This may reduce and/or substantially eliminate increases in wear of one or more inboard stator discs (e.g., stator disc 60) which may be closer to actuator 66 than other, more outboard stator discs (e.g., stator disc 61 and/or stator disc 62). The reduction and/or substantially elimination of variations in the braking torque may reduce and/or substantially eliminate variations in temperature experienced among stator discs 60, 61, 62, limiting variations in rate of wear and/or oxidation that might occur among stator discs 60, 61, 62.

In some examples, spline 64 includes a flex member extending from the central member to the load member. The flex member is configured to substantially deform (e.g., substantially compress) in a manner allowing the load member to move relative to the central member in the axial direction when the load member receives the torque. In examples, the flex member is configured to return the load member to the unloaded position when the load member ceases to receive a torque from stator discs 60, 61, 62. In some examples, the flex member may be a substantially elastic member.

Spline 64 is primarily referred to herein for ease of description, but the discussion herein can also apply to one or more other splines of brake assembly 40, such as a second spline 63 (FIG. 2) of brake assembly 40. Similarly, stator discs 60. 61, 62, are primarily referred to herein for ease of description, but the discussion herein can also apply to one or more other stator discs, pressure plate 65, and/or backing plate 67 of brake assembly 40.

In some examples, actuator 66 is configured to compress disc stack 52 (e.g., impart actuator force FA) using pressure plate 65. For example, actuator 66 may be configured to cause a piston 68 to translate relative to a body 69 of actuator 66 to compress disc stack 52. Actuator 66 may cause piston 68 to translate using any suitable method. In some examples, actuator 66 is configured to cause translation of piston 68 by supplying and/or venting a pressurized hydraulic fluid to or from a piston chamber. In addition or instead, in some examples, actuator 66 is configured to cause piston 68 to translate through a motion (e.g., a rotary motion) generated by an electric motor. In the example shown in FIG. 2 and FIG. 3, actuator 66 is configured to compress disc stack 52 against backing plate 67.

A housing 71 is configured to partially or fully cover and/or protect one or more components of brake assembly 40, such as actuator body 69. Housing 71 may be configured to attach to torque tube 50 and/or another component of brake assembly 40 configured to remain substantially stationary with respect to torque tube 50. In some examples, housing 71 is configured to at least partially extend outside of wheel cavity 22 on a side of wheel 10 including inboard section 28 (e.g., an inboard side of wheel 10). In some examples, housing 71 is coupled to and/or supported by axial assembly 45.

Wheel 10 may be used with any variety of private, commercial, or military aircraft or other type of vehicle. Wheel 10 may be mounted to a vehicle using, for example, bolt 47 and/or bolt 49, or some other fastening device. Axial assembly 45 may be mounted on a strut of a landing gear (not shown) or other suitable component of a vehicle to connect wheel 10 to the vehicle. Wheel 10 may rotate around axis AR and axial assembly 45 to impart motion to the vehicle. Wheel 10 is shown and described to provide context to the brake assembly described herein, however the brake assembly described herein may be used with any suitable wheel assembly in other examples.

Figure 5:
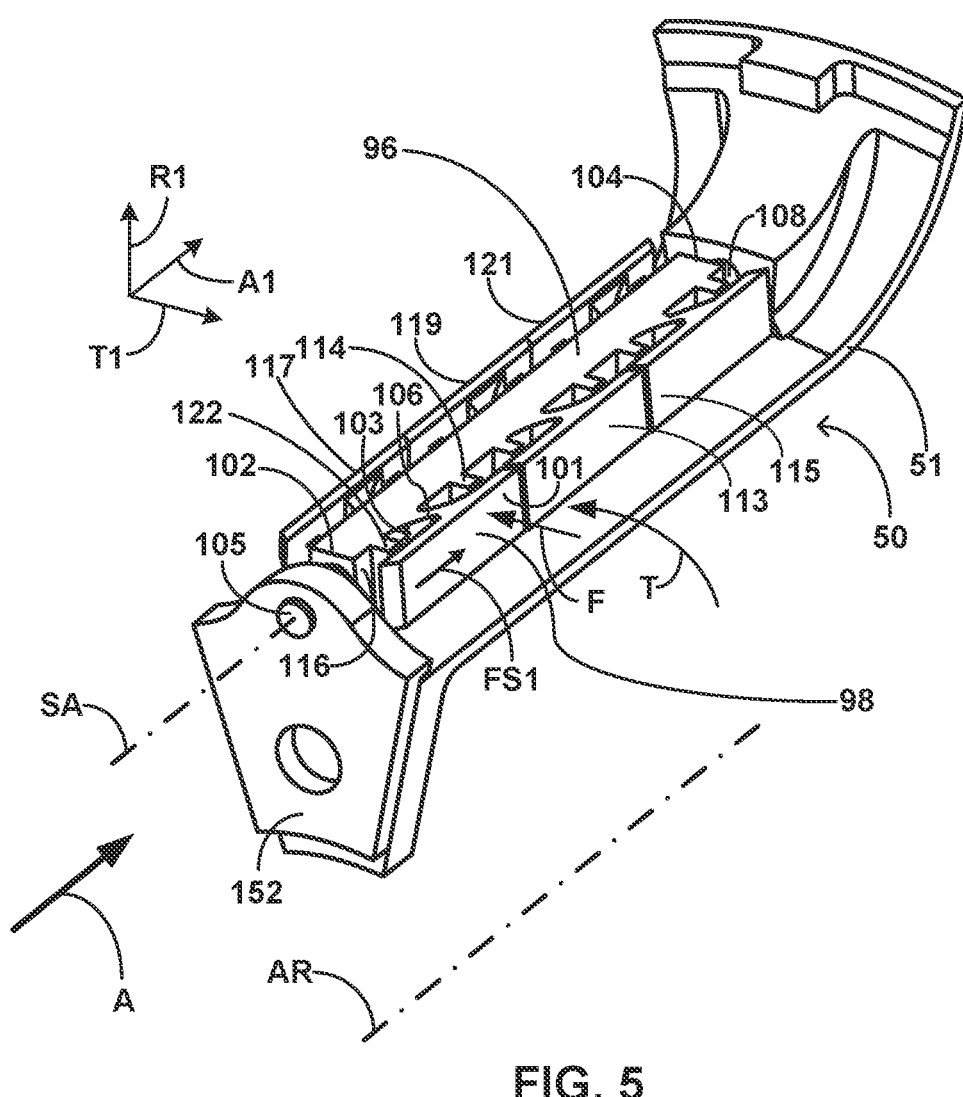
FIG. 5 is a perspective view of a spline coupled to a portion of a torque tube.
Figure 7:
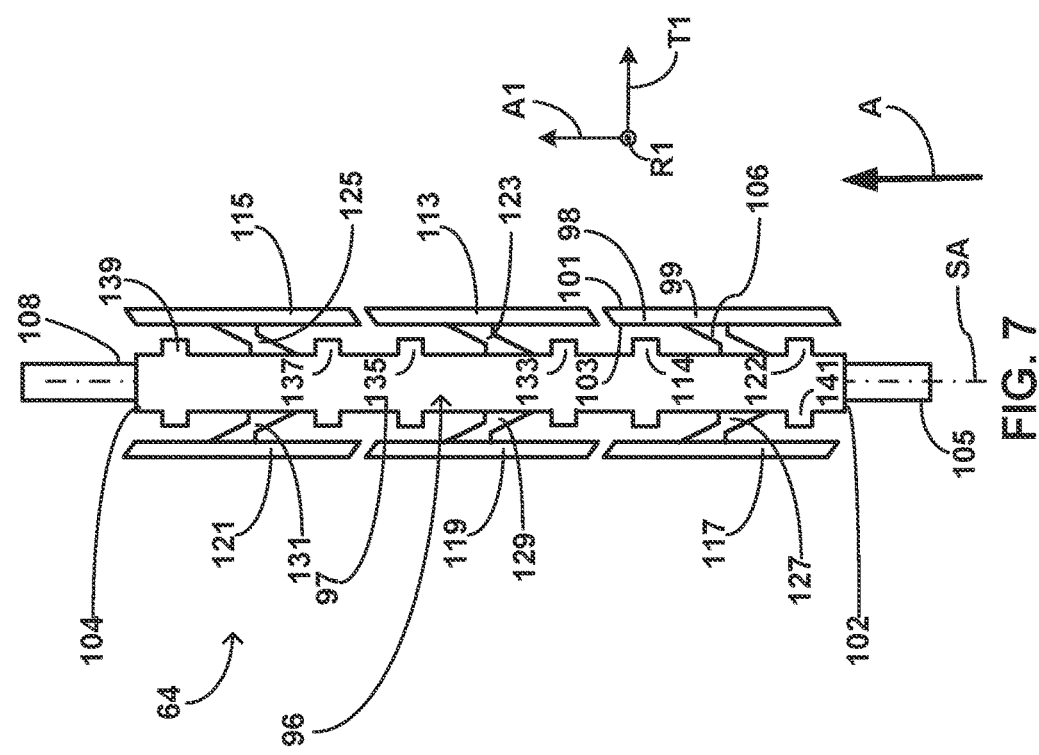
FIG. 7 is a schematic view of the spline of FIG. 5 and FIG. 6.
Figure 6:
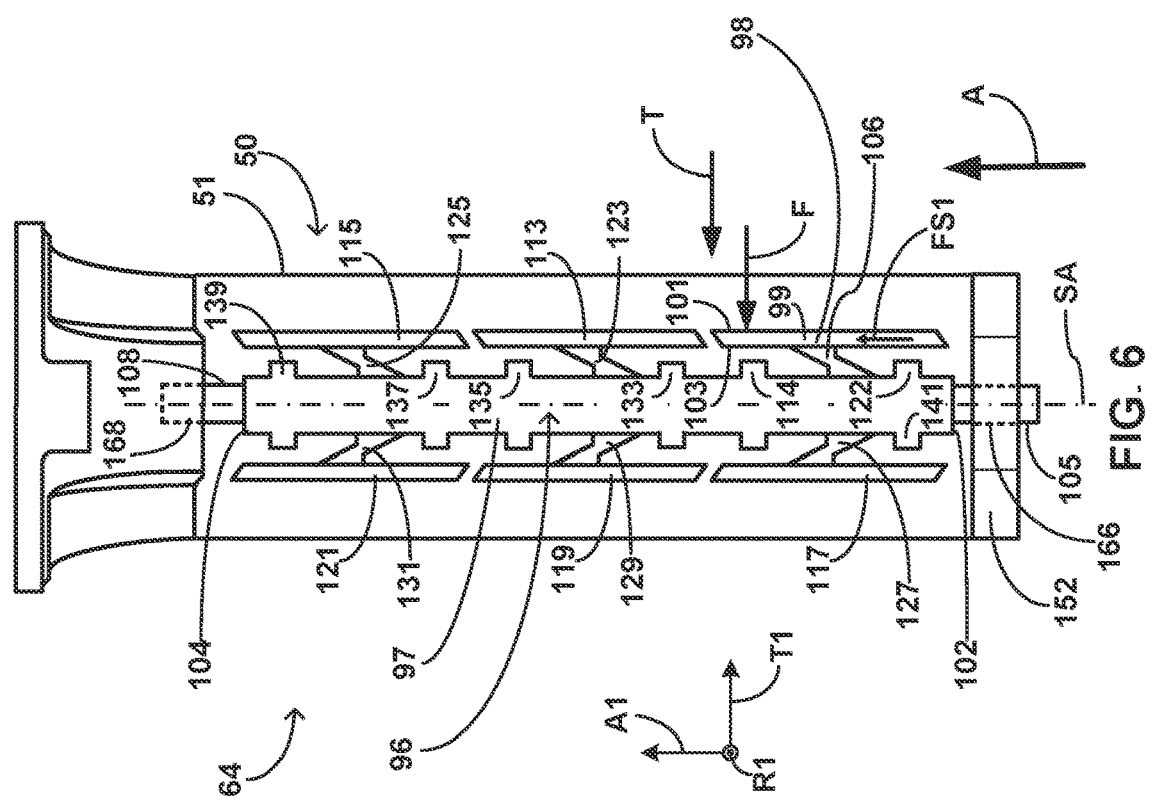
FIG. 6 is a schematic view of the spline of FIG. 5 coupled to the portion of the torque tube of FIG. 5.

FIG. 5 is a perspective view of an example spline 64 coupled to a portion of torque tube 50. Spline 64 includes a central member 96 and a load member 98. In examples, spline 64 includes a flex member 106 extending from central member 96 to load member 98. Central member 96 defines a spline axis SA extending from a first end portion 102 of central member 96 to a second end portion 104 of central member 96. Spline axis SA is configured to extend along axis AR when spline 64 is coupled to torque tube 50. Second end portion 104 is configured to displace from first end portion 102 along axis AR when spline 64 is coupled to torque tube 50. In examples, spline axis SA is substantially parallel (e.g., parallel or nearly parallel to the extent permitted by manufacturing tolerances) to axis AR when spline 64 is coupled to torque tube 50. FIG. 6 is a schematic top view of spline 64 and the portion of torque tube 50. FIG. 7 is a schematic top view of spline 64. FIGS. 5-7 are views oriented in accordance with the axes depicting an axial direction A1, a radial direction R1, and a tangential direction T1. In FIG. 6 and FIG. 7, radial direction R1 proceeds out of the page.

In FIG. 5, and elsewhere, axial direction A1 is a first vector parallel to spline axis SA and having a direction from first end portion 102 to second end portion 104. First tangential direction T1 is a second vector perpendicular to axial direction A1 and having a direction from central member 96 to load member 98. First radial direction R1 is third vector perpendicular to axial direction A1 and tangential direction T1. In examples, radial direction R1 has a direction from axis AR to spline axis SA when spline 64 is coupled to torque tube 50. In some examples, axial direction A1, radial direction R1, and tangential direction T1 define a right-hand coordinate system.

Spline 64 is configured to receive a torque T and transfer at least some portion of the torque T to torque tube 50 (e.g., torque tube body 51). In examples, torque T is a torque around axis AR (e.g., a torque imparted by stator disc 60). Spline 64 is configured to allow some translation of stator disc 60 in the axial direction A1 when stator disc 60 imparts torque T to spline 64.

Load member 98 is configured to move (e.g., in axial direction A1) relative to central member 96 when load member 98 receives torque T. Movement of load member 98 when load member 98 receives torque T from stator discs 60 may reduce a displacement of stator disc 60 along load member 98 as actuator 66 causes compression of disc stack 52. The reduced displacement may limit a magnitude of frictional force FR1 (FIG. 4) during the translation of stator disc 60, resulting in a more consistent transfer of axial force (e.g., actuator force FA (FIG. 4)) through disc stack 52. The more consistent transfer may reduce variations in braking load carried by individual stator discs during compression of disc stack 52.

Load member 98 is configured to receive torque T and transfer torque T to central member 96. In examples, torque T acts to impart a force F on load member 98 (e.g., a force F in the tangential direction T1). Load member 98 is configured to transfer force F to central member 96. In examples, load member 98 is configured to receive torque T and/or force F from a stator disc of a brake assembly (e.g., one or more of stators 60, 62, 62). For example, load member 98 may be configured to receive torque T and/or force F when the stator disc contacts load member 98 and imparts torque T and/or force F on load member 98. In examples, load member 98 is configured such that contact between the stator disc (e.g., stator disc 60) and the impartation of torque T and/or force F causes load member 98 to translate (e.g., in the axial direction A1) relative to central member 96.

In examples, spline 64 includes a plurality of load members, such as load member 98 and one or more of a load member 113, a load member 115, a load member 117, a load member 119, and/or a load member 121. Spline 64 may include a plurality of flex members, such as flex member 106 and one or more of a flex member 123, a flex member 125, a flex member 127, a flex member 129, and/or a flex member 131. In examples, each flex member of the plurality of flex members extends between central member 96 and at least one load member, e.g., a respective load member. For example, in the example shown in FIGS. 5 and 6, flex member 123 extends between central member 96 and load member 113, flex member 125 extends between central member 96 and load member 115, flex member 127 extends between central member 96 and load member 117, flex member 129 extends between central member 96 and load member 119, and flex member 131 extends between central member 96 and load member 121. Spline 64 may include any number of load members. Additionally a load member of spline 64 may be coupled to a single flex member extending between central member 96 and the load member or a plurality of flex members (e.g., two or more) extending between central member 96 and the load member.

Although load member 98 and flex member 106 are mainly referenced in the discussion below and elsewhere, similar description may apply to load members 113, 115, 117, 119, 121 and/or flex members 123, 125, 127, 129, 131 when load members 113, 115, 117, 119, 121 are configured to receive a torque and/or receive a torque in the rotational direction of torque T or in a rotational direction opposite the rotational direction of torque T. Further, although stator disc 60 is referenced in the discussion below and elsewhere, similar description may apply to stator disc 61, stator disc 62, and/or another stator discs within brake assembly 40 and/or another brake assembly.

Load member 98 includes a body 99 ("load member body 99") (FIG. 6) configured to transfer torque T and/or force F to central member 96. Central member 96 includes a body 97 ("central member body 97") configured to receive torque T and/or force F from load member 98. In examples, load member body 99 defines a load face 101 configured to receive torque T and/or force F and/or a transfer face 103 configured to transfer torque T and/or force F to central member 96. In examples, load member body 99 defines load face 101 on a first side of load member body 99 and defines transfer face 103 on a second side of load member body 99 substantially opposite the first side. Load member body 99 may be configured to transfer torque T and/or force F from load face 101 to transfer face 103.

In examples, frictional engagement between spline 64 and stator disc 60 may cause load member 98 to move (e.g., in axial direction A1) relative to central member 96. For example, frictional engagement (e.g., contact) between spline 60 and load member 98 (e.g., load face 101) may cause stator disc 60 to impart a first stator force FS1 to load member 98 (e.g., to load face 101) when stator disc 60 contacts and imparts torque T and/or force F to load member 98. First stator force FS1 may arise as a result of, for example, static friction when stator disc 60 is substantially stationary relative to load member 98, or sliding friction when stator disc 60 moves in the axial direction A relative to load member 98. In examples, first stator force FS1 arises as frictional force FR1 (FIG. 4), frictional force FR2 (FIG. 4), and/or frictional force FR3 (FIG. 4) is imparted to stator disc 60, 61, 62.

Load member 98 may be configured such that first stator force FS1 causes load member 98 to move (e.g., in axial direction A1) relative to central member 96. The movement of load member 98 in the axial direction A1 may reduce a displacement of stator disc 60 relative to load member 98 when stator disc 60 translates in axial direction A1 relative to torque tube body 51 (e.g., as a result of actuator force FA (FIG. 4)). The reduced displacement of stator disc 60 relative to load member 98 may limit a magnitude of frictional force FR1 (FIG. 4) imparted to stator disc 60 during the translation of stator disc 60, limiting variations in braking load carried by individual stator discs during compression of disc stack 52.

In examples, spline 64 includes one or more load members such as load member 117, load member 119, and/or load member 121 configured to receive a torque (e.g., from stator disc 60) in a rotational direction substantially opposite that of torque T and/or receive a force having a direction substantially that of opposite force F. Load member 117, 119, 121 may be configured to translate in axial direction A1 and/or towards central member 96 (e.g., in the tangential direction T1) when load member 117, 119, 121 receives the torque in the rotational direction opposite torque T and/or receives the force in a direction opposite force F. For example, when load member 98 is configured to receive torque T in the rotational direction of torque T1 (FIG. 3), load member 117, 119, 121 may be configured to receive a torque in the rotational direction of torque T2 (FIG. 3). Load member 117, 119, 121 is configured to transfer the torque in the rotational direction substantially opposite that of torque T and/or transfer the force having a direction substantially that of opposite force F to central member 96.

In some examples, a load member (e.g., load member 117, 119, 121) configured to receive a torque in tangential direction T1 may be configured to axially align (e.g., substantially align in the axial direction A1) with a load member (e.g., load member 98, 113, 115) configured to receive a torque in a direction opposite tangential direction T1, although this is not required. In some examples, a number of load members configured to receive the torque in tangential direction T1 may be equal to a number of load members configured to receive the torque in the direction opposite tangential direction T1, although this is not required.

In examples, spline 64 is configured such that central member 96 substantially separates (e.g., positions between) one or more of load member 98, load member 113, and/or load member 115 and load member 117, 119, 121 when spline 64 couples to torque tube 50. In examples, load member 117, 119, 121 is configured to displace from central member 96 and/or load member 98 in a direction opposite tangential direction T1 when spline 64 couples to torque tube 50. Although spline 64 is discussed mainly with reference to load member 98 configured to receive and/or receiving torque T and/or force F, similar discussion may apply to load member 117, 119, 121 when load member 117, 119, 121 is configured to receive and/or receives a torque having a rotational direction opposite torque T and/or a force having a direction opposite force F.

Central member 96 is configured to receive torque T and/or force F from load member 98. Central member 96 is configured to transfer torque T and/or force F to torque tube body 51 when spline 62 is coupled to torque tube 50. Central member 96 may be configured to remain substantially stationary relative to torque tube body 51 and/or translate (e.g., in axial direction A1) to some degree relative to torque tube body 51 when load member 98 moves relative to central member 96.

For example, spline 64 may be configured such that, when load member 98 receives torque T and/or force F, load member 98 translates in axial direction A1 and relative to torque tube body 51 by a first translation displacement, and central member 96 translates in axial direction A1 and relative to torque tube body 51 by a second translation displacement less than the first translation displacement. In some examples, the second translation displacement of central member 96 may arise due to a condition of one or more components of brake assembly 40. For example, central member 96 may translate relative to torque tube body 51 if torque tube body 51 (e.g., under certain operating conditions) elongates in axial direction A1 as a result of actuator force FA. In some examples, central member 96 may remain substantially stationary relative to torque tube body 51 when load member 98 translates relative to torque tube body 51.

Spline 64 is configured to couple with (e.g., mechanically engage) torque tube body 51 and/or one or more components (e.g., a key 152) supported by torque tube body 51. In some examples, central member 96 is configured to transfer torque T and/or force F to torque tube body 51 by directly imparting transfer torque T and/or force F to torque tube body 51 when spline 64 couples with torque tube body 51. In some examples, central member 96 is configured to transfer torque T and/or force F to torque tube body 51 by imparting transfer torque T and/or force F to the one or more components supported by torque tube body 51. Spline 64 may be configured to transfer a first portion of torque T and/or force F to torque tube body 51 via first end portion 102 and transfer a second portion of torque T and/or force F to torque tube body 51 via second end portion 104. Second end portion 104 is displaced from first end portion 102 in axial direction A1. In some examples, spline 64 is configured to transfer a portion of torque T and/or force F from first end portion 102 to key 152. Key 152 may be configured to transfer the portion of torque T and/or force F to housing 71 (e.g., via bolts connecting key 152 and actuator housing 71). Housing 71 may be configured to transfer the portion of torque T and/or force F to landing gear of a vehicle (e.g., via a torque takeout lug (not shown)).

In examples, spline 64 includes a first end structure 105 configured to transfer at least some portion of torque T and/or force F to torque tube body 51. In addition, in some examples, spline 64 includes a second end structure 108 configured to transfer at least some portion of torque T and/or force F to torque tube body 51. In examples, first end portion 102 includes first end structure 105 and/or second end portion 104 includes second end structure 108. First end structure 105 may be coupled to (e.g., attached to, and/or a unitary component with) first end portion 102. Second end structure 108 may be coupled to (e.g., attached to, and/or a unitary component with) second end portion 104. In examples, first end structure 105 is configured to transfer a first portion of torque T and/or force F to torque tube body 51 and/or second end structure 108 is configured to transfer a second portion of torque T and/or force F to torque tube body 51.

In some examples, brake assembly 40 and/or spline 64 includes key 152 configured to couple with (e.g., mechanically engage) torque tube body 51 and one of first end portion 102 (e.g., first end structure 105) or second end portion 104 (e.g., second end structure 108). In some examples, key 152 is a substantially annular component configured to substantially surround longitudinal axis L. Key 152 may be configured to couple with (mechanically engage) a first end portion or a second end portion of a plurality of splines (e.g., substantially all) of brake assembly 40.

Spline 64 may be configured to transfer a portion of torque T and/or force F from central member 96 to key 152. Key 152 may be configured to transfer the portion of torque T and/or force F from central member 96 to torque tube body 51. Key 152 may be configured such that key 152 is substantially stationary relative to torque tube body 51 when load member 98 moves relative to torque tube body 51. In examples, key 152 is a unitary (e.g., substantially contiguous) component with torque tube body 51. In some examples, key 152 is physically separate from and then affixed to torque tube body 51 by welding, soldering, fasteners, adhesives, or other fixation methods. Configuring key 152 to affix to torque tube body 51 may simplify a fabrication of torque tube body 51 by, for example, allowing a portion of torque tube body 51 to be fabricated by turning prior to affixing key 152. Configuring key 152 to affix to torque tube body 51 may ease assembly and/or disassembly during replacement of one or more of rotor discs 54, 55, 56, 57 and/or one or more of stator discs 60, 61, 62.

Spline 64 includes flex member 106 extending from central member 96 to load member 98. In some examples, flex member 106 (e.g., body 107 of flex member 106 ("flex member body 107")) is configured to substantially deform (e.g., substantially compress and/or bend) in a manner allowing load member 98 to move relative to central member 96 when load member 98 receives torque T and/or force F (e.g., from stator disc 60). In some examples, load member 98 (e.g., load member body 99) is configured to substantially place flex member 106 in compression between load member 98 and central member 96 when load member 98 receives torque T and/or force F. The compression may cause deformation and/or bending of flex member 106 as load member 98 moves relative to central member 96 in axial direction A1 and/or a direction opposite tangential direction T1.

Figure 8:
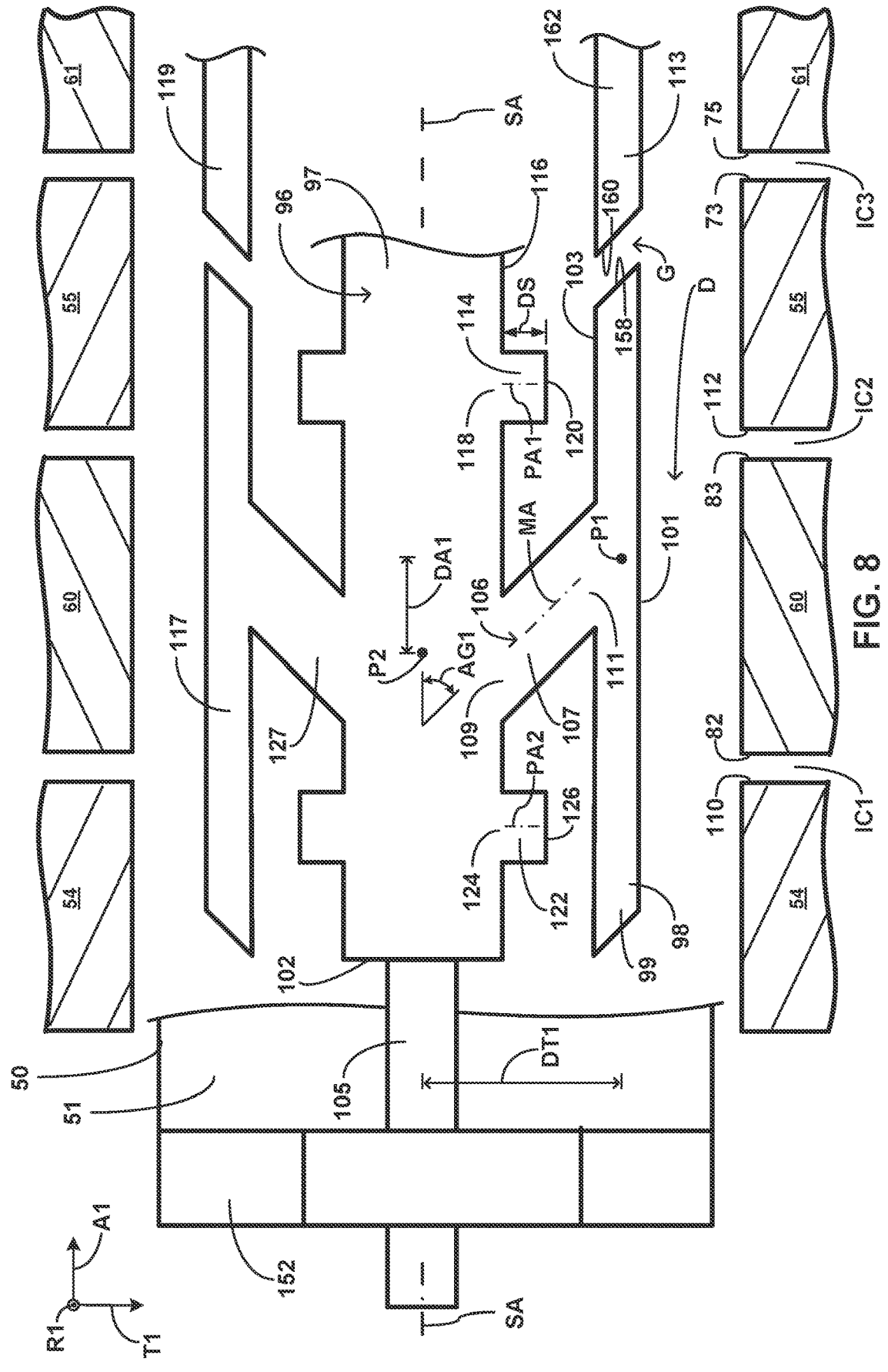
FIG. 8 is a schematic view of a portion of a spline including a load member in an unloaded position.

FIG. 8 illustrates a schematic overhead view depicting a portion of spline 64, torque tube 50, and disc stack 52 including portions of rotor disc 54, stator disc 60, and rotor disc 55. Pressure plate 65 is omitted for clarity. Disc stack 52 is in the uncompressed configuration (e.g., not experiencing actuator force FA from actuator 66), such that intervening clearances (e.g. gaps) are present between adjacent discs in disc stack 52. For example, with disc stack 52 in the uncompressed configuration, disc stack 52 may define an intervening clearance IC1 between a friction surface 110 of rotor disc 54 and friction surface 82 of stator disc 60. In the uncompressed condition, disc stack 52 may define an intervening clearance IC2 between second friction surface 83 of stator disc 60 and a friction surface 112 of rotor disc 55. In the uncompressed condition, disc stack 52 may define an intervening clearance IC3 between a second friction surface 73 of rotor disc 55 and a friction surface 75 of stator disc 61. Intervening clearance IC1, intervening clearance IC2, and intervening clearance IC3 substantially prevent and/or limit contact between friction surfaces of rotor disc 54, stator disc 60, rotor disc 55, and stator disc 61, such that the rotor disc 54 and rotor disc 55 (and other rotor discs in disc stack 52) rotate substantially synchronously with wheel 10 (FIG. 1) as stator disc 60 and stator disc 61 (and other stator discs in disc stack 52) remain substantially stationary with respect to torque tube body 51.

FIG. 8 depicts load member 98 is in an unloaded position relative to central member 96. Spline 64 is configured such that load member 98 substantially holds in the unloaded position when load member 98 receives limited (e.g., substantially none or less than a threshold amount) torque T and/or force F (e.g., when load member 98 is substantially unloaded). In some examples, spline 64 is configured such that load member 98 substantially holds in the unloaded position when disc stack 52 is in the uncompressed configuration. In examples, in the unloaded position, load member 98 defines a first axial displacement DA1 relative to central member 96. In the unloaded position, load member 98 may define a first tangential displacement DT1 relative to central member 96. Load member 98 may define first axial displacement DA1 in the axial direction A1 and/or define first tangential displacement DT1 in first tangential direction T1. In examples, load member 98 defines first axial displacement DA1 between a point P1 on load member body 99 and a point P2 on central member body 97, and/or defines first tangential displacement DT1 between point P1 and point P2.

Flex member 106 may be configured to substantially hold load member 98 in the unloaded position when flex member 106 is in an undeformed configuration. For example, flex member 106 (e.g., flex member body 107) may include a first end 109 ("first flex member end 109") and a second end 111 ("second flex member end 111") opposite first flex member end 109. Flex member 106 may be in the undeformed configuration when compressive stresses on first flex member end 109 (e.g., imparted by central member 96) and/or compressive stresses on second flex member end 111 (e.g., imparted by load member 98) are negligible and/or substantially absent (e.g., in the absence of a braking event). In some examples, flex member 106 is in the undeformed configuration when flex member 106 holds load member 98 such that load member 98 defines first axial displacement DA1 relative to central member 96 and/or defines first tangential displacement DT1 relative to central member 96.

First flex member end 109 is directly or indirectly coupled to central member 96 (e.g., central member body 97). Second flex member end 111 is directly or indirectly coupled to load member 98 (e.g., load member body 99). In some examples, first flex member end 109 is physically separate from and then affixed to central member 96 by welding, soldering, fasteners, adhesives, or other fixation methods. In some examples, second flex member end 111 is physically separate from and then affixed to load member 98 by welding, soldering, fasteners, adhesives, or other fixation methods. In other examples, flex member 106, first flex member end 109, and/or second flex member end 111 is a unitary (e.g., substantially contiguous) component with central member body 97 and/or load member body 99. Flex member 106 may comprise any suitable material or combination of materials configured to deform (e.g., bend and/or flex) in a direction parallel to axial direction A1 and/or tangential direction T1. For example, in some examples, flex member 106 may comprise a substantially solid, unified material extending at least partially from first flex member end 109 to second flex member end 111. In some examples, flex member 106 may comprise a material defining voids and/or passageways and extending at least partially from first flex member end 109 to second flex member end 111, such as a honeycomb-type material.

In examples, flex member body 107 defines a flex member axis MA extending from first flex member end 109 to second flex member end 111. Flex member 106 may be configured such that flex member axis MA defines an angle AG1 with spline axis SA when load member 98 is in the unloaded position. In examples, angle AG1 is less than 90 degrees, such that second flex member end 111 is displaced from first flex member end 109 in the axial direction A1. In some examples, angle AG1 is less than 70 degrees. Flex member 106 may define angle AG1 less than 90 degrees to promote deformation of flex member 106 in axial direction A1 when load member 98 receives torque T and/or force F. For example, second flex member end 111 may be displaced from first flex member end 109 in axial direction A1 (e.g., when angle AG1 is less than 90 degrees). The displacement of second flex member end 111 from first flex member end 109 may tend to cause flex member 106 to deform in axial direction A1 when load member 98 receives torque T and/or force F.

In some examples, stator disc 60 is displaced from load member 98 by a clearance D when load member 98 is in the unloaded position, although this is not required. Load member 98 and/or flex member 106 may be configured such that load member 98 substantially remains in the unloaded position when stator disc 60 is in contact with load member 98 but does not transfer substantial torque or force to load member 98 (e.g., does not transfer torque or force sufficient to cause deformation of flex member 106). In some examples, load member 98 and/or flex member 106 are configured such that load member 98 substantially retains the unloaded position when disc stack 52 is in the uncompressed condition (e.g., in the absence of actuator force FA imparted by actuator 66 (FIG. 4)).

Figure 9:
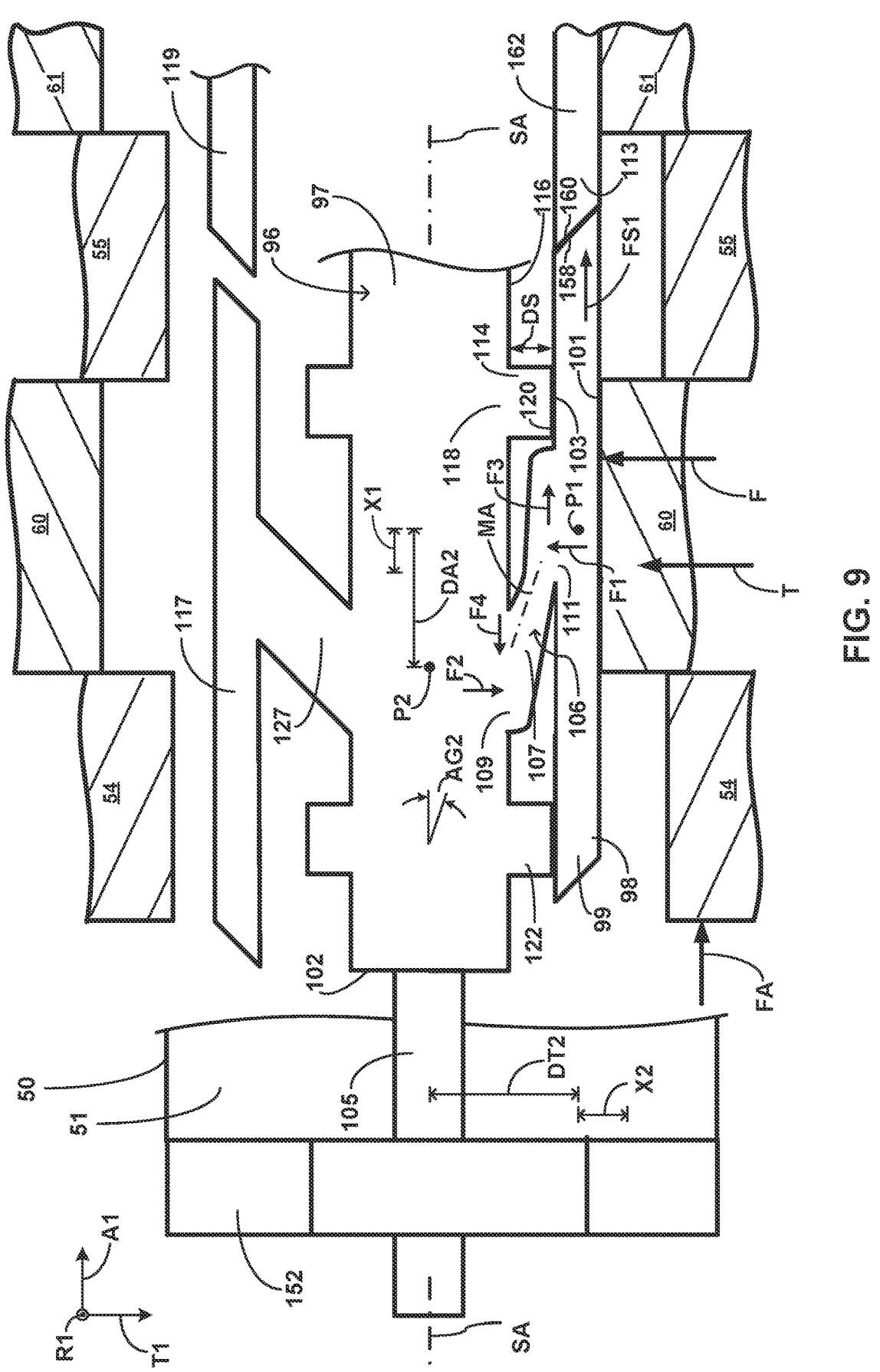
FIG. 9 is a schematic view of the portion of the spline of FIG. 8 including a load member in a loaded position.

FIG. 9 illustrates a schematic overhead view depicting the portion of spline 64, torque tube 50, and disc stack 52 including portions of rotor disc 54, stator disc 60, and rotor disc 55, with disc stack 52 in the compressed configuration (e.g., receiving an actuator force FA imparted by, for example, actuator 66, such as during a braking event). Pressure plate 65 is omitted for clarity. In examples, pressure plate 65 may contact one or more load members (e.g., load member 98, 117) in the compressed configuration. In the compressed configuration, intervening clearances between adjacent discs in disc stack 52 (e.g., intervening clearance IC1, intervening clearance IC2, and/or intervening clearance IC3 (FIG. 8)) close, such that friction surface 110 engages friction surface 82, second friction surface 83 engages friction surface 112, and second friction surface 73 engages friction surface 75. The engagement of the friction surfaces causes one or more of stator discs 60, 61, 62 (e.g., stator disc 60) to impart torque T and/or force F on load member 98.

FIG. 9 depicts load member 98 in a loaded position relative to central member 96. Load member 98 may be configured to establish the loaded position when load member 98 receives torque T and/or force F (e.g., from stator disc 60 and/or another stator disc of disc stack 52). Load member 98 may be configured to move in the axial direction A1 relative to central member 96 and/or move in a direction opposite first tangential direction T1 relative to central member 96 when load member 98 receives torque T and/or force F.

In some examples, spline 64 is configured such that load member 98 establishes the loaded position when load member 98 transfers some portion of torque T and/or force F to central member 96 using a transfer pathway other than flex member 106 (e.g., a transfer pathway including support 114 and/or support 122). In examples, spline 64 is configured such that load member 98 establishes the loaded position when flex member 106 ceases to deform while receiving torque T and/or force F from load member 98. In some examples, load member 98 is configured to establish the loaded position when second flex member end 111 receives a first force F1 having a first magnitude and in a direction opposite tangential direction T1, and first flex member end 109 receives a second force F2 having a second magnitude substantially equal to the first magnitude and in tangential direction T1. In some examples, load member 98 is configured to establish the loaded position when second flex member end 111 receives a third force F3 having a third magnitude and in the axial direction A1, and first flex member end 109 receives a fourth force F4 having a fourth magnitude substantially equal to the third magnitude and in a direction opposite axial direction A1. For example, flex member 106 may receive first force F1 and/or third force F3 from load member 98 (e.g., as load member 98 transfers torque T and/or force F to second flex member end 111). Flex member 106 may receive second force F2 and/or fourth force F4 from central member 96 (e.g., as central member 96 imparts a reaction force to first flex member end 109 in response to first force F1 and/or third force F3). In some examples, spline 64 is configured such that load member 98 establishes the loaded position when load member 98 ceases to move relative to central member 96 as load member 98 receives torque T and/or force F.

Movement of load member 98 in axial direction A1 when load member 98 receives torque T and/or force F from stator disc 60 may result in less relative displacement between stator discs 60 and load member 98 as stator disc 60 moves in axial direction A1 (e.g., when actuator 66 imparts actuator force FA on disc stack 52). The reduced relative displacement may reduce a magnitude of frictional force FR1 (FIG. 4) generated on stator disc 60 during its translation, such that frictional drag on stator disc 60 is limited and stator disc 60 transfers more of actuator force FA to rotor disc 55 and other discs within disc stack 52. Similarly, movement of one or more of load member 98, load member 113, and/or load member 115 may reduce a magnitude of frictional forces (e.g., FR2 and/or FR3) as stator discs 61, 62 translate in axial direction A1. The reduced magnitudes of the frictional forces arising between stator disc 60, 61, 62 and load members 98, 113, 115 may cause actuator force FA to transfer through disc stack 52 more consistently, and reduce variations in braking load carried by individual stator discs during compression of disc stack 52.

For example, in the loaded position (FIG. 9), load member 98 may define a second axial displacement DA2 relative to central member 96, with second axial displacement DA2 greater than first axial displacement DA1 (FIG. 8). In the loaded position, load member 98 may define a second tangential displacement DT2 relative to central member 96, with second tangential displacement DT2 less than first tangential displacement DT1 (FIG. 8). Load member 98 may define second axial displacement DA2 in the axial direction A1 and/or define second tangential displacement DT2 in first tangential direction T1. In examples, load member 98 defines second axial displacement DA2 between point P1 and point P2, and/or defines second tangential displacement DT2 between point P1 and point P2.

Load member 98 is configured to transition from the unloaded position to the loaded position when lead member 98 receives torque T and/or force F, e.g., during a braking event. Load member 98 may be configured to transfer torque T and/or force F to central member 96 in the loaded position. In examples, load member 98 is configured to cause flex member 106 to deform and/or bend when load member 98 transitions from the unloaded position to the unloaded position. In examples, load member 98 is configured to cause flex member 106 to deform and/or bend when load member 98 moves relative to central member 96 in the axial direction A1 and/or in a direction opposite first tangential direction T1. Flex member 106 may be configured such that flex member axis MA defines an angle AG2 with spline axis SA when load member 98 is in the loaded position. Angle AG2 may be less than angle AG1.

In examples, spline 64 is configured such that load member 98 places flex member 106 (e.g., flex member body 107) in compression between load member 98 and central member 96 when load member 98 receives and/or transfers torque T and/or force F (e.g., when load member 98 transitions to and/or substantially establishes the loaded position). For example, load member 98 may cause flex member 106 to experience compressive and/or bending stresses between second flex member end 111 and first flex member end 109 when load member 98 receives and/or transfers torque T and/or force F. In examples, flex member 106 is configured to deform and/or bend when load member 98 moves relative to central member 96 in the axial direction A1 and/or in a direction opposite first tangential direction T1. In some examples, flex member 106 is configured to decrease angle AG when load member 98 moves relative to central member 96 in the axial direction A1 and/or in a direction opposite first tangential direction T1.

Flex member 106 may be configured to substantially establish a deformation configuration when load member 98 receives and/or transfers torque T and/or force F. Flex member 106 may be in the deformation configuration when flex member 106 experiences compressive stresses between second flex member end 111 and first flex member end 109 (e.g., imparted by load member 98). In examples, flex member 106 is configured to cause second flex member end 111 to displace in the axial direction A1 away from first flex member end 109 when flex member 106 transitions from the undeformed configuration to the deformed configuration. In some examples, flex member 106 is configured to cause second flex member end 111 to move toward first flex member end 109 in a direction opposite tangential direction T1 when flex member 106 transitions from the undeformed configuration to the deformed configuration.

In examples, flex member 106 is configured to transition and/or deform from the undeformed configuration to the deformed configuration when second flex member end 111 receives first force F1 (e.g., from load member 98) and first flex member end 109 receives second force F2 (e.g., from central member 96), and the first magnitude of force F1 is greater than the second magnitude of force F2 (e.g., such that flex member 106 experiences an unbalanced load in tangential direction T1). In examples, flex member 106 is configured to transition from the undeformed configuration to the deformed configuration when second flex member end 111 receives third force F3 (e.g., from load member 98) and first flex member end 109 receives fourth force F4 (e.g., from central member 96), and the third magnitude of force F3 is greater than the fourth magnitude of force F4 (e.g., such that flex member 106 experiences an unbalanced load in axial direction A1). Once in the deformed configuration, load member 98 and flex member 106 may be in a static equilibrium.

Flex member 106 may be configured to return load member 98 to the unloaded position between braking operations of brake assembly 40. For example, flex member 106 is configured to cause load member to transition from the loaded position (e.g., as depicted in FIG. 9) to the unloaded position (e.g., as depicted in FIG. 8). In examples, flex member 106 is configured to cause load member to transition from the loaded position to the unloaded position when load member 98 ceases to receive torque T and/or force F. In some examples, flex member 106 is resiliently biased to hold load member 98 in the unloaded position (e.g., in the absence of torque T and/or force F). Flex member 106 may configured such that flex member 106 holds load member in the unloaded position unless a force on load member 98 (e.g., force F) overcomes the resilient biasing of flex member 106 and causes load member 98 to depart from the unloaded position.

In examples, flex member 106 is configured to transition from the deformation configuration to the undeformed configuration to cause load member 98 to transition from the loaded position to the unloaded position. For example, flex member 106 may include a substantially elastically deforming member which exhibits a change in shape when a compressive force (e.g., in a direction opposite tangential direction T1) and/or a shearing force (e.g., in axial direction A1) is imparted to flex member 106. (e.g., imparted by load member 98). Flex member 106 may be configured to substantially reverse the change in shape when the compressive force and/or shearing force is removed. Flex member 106 (e.g., second flex member end 111) may be configured to impart a force on load member 98 when flex member 98 reverses the change in shape, causing load member 98 to transition from the loaded position to the unloaded position.

In some examples, load member 98 may be configured to move relative to central member 96 in axial direction A1 by from about 0.015 to about 0.045 inches when load member 98 transitions from the loaded position to the unloaded position. For example, a difference X1 between displacement DA2 and displacement DA1 may be from about 0.015 to about 0.045 inches. Load member 98 may be configured to move relative to central member 96 in a direction opposite tangential direction T1 by from about 0.015 to about 0.065 inches when load member 98 transitions from the loaded position to the unloaded position. For example, a difference X2 between displacement DT1 and displacement DT2 may be from about 0.015 to about 0.065 inches. In examples, when load member 98 transitions from the loaded position to the unloaded position, a ratio of difference X1 divided by difference DA1 (e.g., X1/DA1) may be from about 0.3 to about 2.3. A ratio of difference X2 divided by difference DT1 (e.g., X2/DT1) may be from 0.2 to about 1.8 In some examples, when load member 98 transitions from the loaded position to the unloaded position, a ratio of difference X1 divided by difference X2 (e.g., X1/X2) is from about −1.0 to about 1.0.

In examples, central member 96 includes one or more supports such as a support 114. In some examples, instead of or in addition to support 114, central member 96 includes a support 122. Supports 114, 122 may be configured to receive torque T and/or force F from load member 98 when load member 98 transfers torque T and/or force F to central member 96 (e.g., load member 98 may transfer torque T and/or force F via support 114). In examples, support 114, 122 is configured to substantially limit the deformation of flex member 106 (e.g., flex member body 107) when load member 98 transfers torque T and/or force F to central member 96. Limiting the deformation of flex member 106 may assist in keeping flex member 106 within a substantially elastic range of deformation such that, for example, flex member 106 substantially avoids a plastic deformation when load member 98 transfers torque T and/or force F. Keeping flex member 106 within the elastic range may allow flex member 106 to substantially preserve its resilient biasing, such that flex member 106 may return load member 98 to the unloaded position over a longer period of brake operation cycles of brake assembly 40.

In examples, supports 114, 122 are configured to extend from a surface 116 defined by central member body 97. Central member body 97 may define surface 116 such that surface 116 substantially faces load member 98. In examples, surface 116 substantially faces transfer face 103. In examples, spline 64 is configured such that surface 116 is displaced from transfer face 103 when load member 98 transfers torque T and/or force F to central member 96 (e.g., when load member 98 is in the loaded position).

In some examples, support 114 includes a base end 118 and a loading end 120 opposite base end 118. Support 114 may extend from surface 116 from base end 118 to loading end 120 such that loading end 120 is displaced in tangential direction T1 from surface 116. For example, support 114 may be configured to define a displacement DS from loading end 120 to surface 116. Support 122 may include a base end 124 and a loading end 126 opposite base end 124. Support 122 may extend from surface 116 from base end 124 to loading end 126 such that loading end 126 is displaced in tangential direction T1 from surface 116. In examples, support 122 may be configured such that a displacement from surface 116 to loading end 126 is substantially equal to displacement DS (e.g., equal or nearly equal to the extent permitted by manufacturing tolerances).

Supports 114, 122 are each configured to limit and/or halt movement of load member 98 in a direction opposite tangential direction T1 when load member 98 receives torque T and/or force F. In examples, each of supports 114, 122 are configured to cause load member 98 to define second tangential displacement DT2 when load member 98 is in the loaded position. Spline 64 may be configured such that transfer face 103 contacts loading end 120 and/or loading end 126 when load member 98 is in the loaded position. In examples, supports 114, 122 are configured to receive at least some portion of torque T and/or force F via loading end 120, 126. Load member 98 may be configured to transfer the portion of torque T and/or force F from transfer face 103 to loading end 120, 126 (e.g., when transfer face 103 contacts loading end 120, 126). In examples, support 114 is configured such that transfer face 103 is displaced from surface 116 substantially by the displacement DS when transfer face 103 contacts loading end 120, 126.

In examples, spline 64 includes a plurality of supports including support 114 and/or support 122, and one or more of a support 133, a support 135, a support 137, a support 139, a support 141, and/or other supports similarly depicted.

Support 133, 135, 137, 139, 141, and/or other supports may be configured to receive a torque and/or a force from one or more of load member 113, 115, 117, 119, 121 when load member 113, 115, 117, 119, 121 transfers the torque and/or force to central member 96. In examples, support 133, 135, 137, 139, 141, and/or other supports are configured to substantially limit the deformation of flex member 123, 125, 127, 129, 131 when load member 113, 115, 117, 119, 121 transfers the torque and/or the force to central member 96. Support 133, 135, 137, 139, 141, and/or other supports may be configured to limit and/or halt movement of load member 113, 115, 117, 119, 121 in the tangential direction T1 or in a direction opposite tangential direction T1 when load member 113, 115, 117, 119, 121 receives the torque and/or the force. Support 133, 135, 137, 139, 141, and/or other supports may be configured to extend away from spline axis SA in the tangential direction T1 (e.g., support 133, 135, 137, 139) or in the direction opposite tangential direction T1 (e.g., support 141). Although support 114 and support 122 are mainly referenced in the discussion herein, similar explanation may apply to support 133, 135, 137, 139, and/or other supports when load members 113, 115 are configured to receive a force in a direction opposite tangential direction T1 and/or receive a torque in the rotational direction of torque T, and/or may apply to support 141 and/or other supports when load members 117, 119, 121 are configured to receive a force in the tangential direction T1 and/or receive a torque in a rotational direction opposite the rotational direction of torque T.

Spline 64 may be configured such that such a first load member (e.g., load member 98) and a second load member (e.g., load member 113, or one of load member 115, 117, 119, 121) move in axial direction A1 relative to central member 96 by different amounts when spline 64 receives torque T from stator discs 60, 61, 62. For example, spline 64 may be configured to allow load member 98 to displace in axial direction A1 relative to central member 96 by a first displacement (e.g., displacement X1 (FIG. 9)) when load member 98 receives torque T and/or force F from stator disc 60, 61, 62. Spline 64 may be configured to allow load member 113 to displace in axial direction A1 relative to central member 96 by a second displacement different from the first displacement (e.g., when load member 113 receives a torque and/or a force from stator discs 60, 61, 62). The differing displacements may accommodate a difference in translations undergone by stator disc 60, stator disc 61, stator disc 62, and/or other stator discs within disc stack 52 when disc stack 52 compressed.

For example, when disc stack 52 is in the uncompressed configuration, rotor disc 54 and stator disc 60 may be separated by intervening clearance IC1, stator disc 60 and rotor disc 55 may be separated by intervening clearance IC2, and rotor disc 55 and stator disc 61 may be separated by intervening clearance IC3. Stator disc 61 is displaced from stator disc 60 in axial direction A1. Thus, when disc stack 52 is compressed, stator disc 60 is required to translate relative to torque tube body 51 by a first amount sufficient to overcome at least intervening clearance IC2 and intervening clearance IC3, as well as additional intervening clearances between discs that may be further displaced from stator disc 61 in axial direction A1. In contrast, stator disc 61 is required to translate relative to torque tube 51 by a second amount at least sufficient to overcome intervening clearance IC3 and the additional intervening clearances, but is not required to translate to overcome intervening clearance IC2. Hence, stator disc 60 is required to translate relative to torque tube body 51 over by a first amount greater than the second amount of translation required by stator disc 61 when disc stack 52 is compressed.

Spline 64 may be configured to accommodate the differing translations that might be experienced by stator disc 60 and stator disc 61 when disc stack 52 is compressed. This may limit and/or reduce a first relative displacement between stator disc 60 and load member 98 and a second relative displacement between stator disc 61 and load member 113 as disc stack 52 is compressed.

For example, spline 64 may be configured such that load member 98 moves in axial direction A1 substantially with stator disc 60 (e.g., due to frictional forces between stator disc 60 and load member 98) over at least some portion of the translation of stator disc 60, limiting and/or reducing the first relative displacement (e.g., limiting and/or reducing sliding of spline 60 on load member 98). Spline 64 may be configured such that load member 113 moves in axial direction A1 substantially with stator disc 61 (e.g., due to frictional forces between stator disc 61 and load member 113) over at least some portion of the translation of stator disc 61, limiting and/or reducing the second relative displacement (e.g., limiting and/or reducing sliding of stator disc 61 on load member 113). Spline 64 may be configured such that load member 98 moves substantially with stator disc 60 over a translation distance different from a translation distance over which load member 113 moves substantially with stator disc 61 (e.g., to accommodate differences in the first translation of stator disc 60 relative to torque tube body 51 and the second translation of stator disc 61 relative to torque tube body 51). The reductions in the relative displacement between stator disc 60 and load member 98 and/or the relative displacement between stator disc 61 and load member 113 may reduce the frictional forces generated between stator disc 60, 61, 62 and spline 64 as disc stack 52 is compressed, causing a more consistent transfer of actuator force FA through disc stack 52.

In examples, spline 64 is configured such that a first load member (e.g., load member 98) in a plurality of load members is separated from a second load member (e.g., load member 113) adjacent to the first load member by a gap extending in the axial direction A1. The first load member and the second load member may be separated by the gap when the first load member and/or the second load member are in an unloaded position. For example, load member 98 and load member 113 may be separated by gap G (FIG. 8) extending in axial direction A1 when load member 98 and load member 113 are in an unloaded position. Load member 98 may be configured to move to axial direction A1 to reduce and/or reduce or even close gap G (as shown in FIG. 9) when load member 98 receives torque T and/or force F. Hence, load member 98 may move in the axial direction A1 substantially independently from load member 113 at least until load member 98 moves sufficiently to close gap G. Thus gap G may at least partially accommodate differing amounts of translation that may be experienced by stator disc 60 and stator disc 61 when disc stack 52 is compressed.

In some examples, load member 98 (e.g., load member body 99) defines a member end 158 and load member 113 (e.g., a body 162 of load member 113) defines a member end 160. Spline 64 may be configured such that, with load member 98 and load member 113 in an unloaded position, gap G extends between member end 158 and member end 160. Spline 64 may be configured such that load member 98 and load member 113 substantially close gap G when at least load member 98 moves relative to central member 96 in axial direction A1. Spline 64 may be configured to cause load member 98 and load member 113 to close gap G such that stator disc 60, for example, experiences a relatively continuous sliding pathway if stator disc 60 slides from load member 98 to load member 113.

In examples (e.g., as depicted in FIG. 9), spline 64 is configured such that member end 158 contacts member end 160 when load member 98 translates in axial direction A1 relative to central member 96. Member end 158 may be configured to cause load member 113 to move in axial direction A1 when load member 98 moves in axial direction A1 (e.g., once load member 98 has moved sufficiently to close gap G). For example, member end 158 may be configured to impart a force (e.g., in axial direction A1) on member end 160 when load member 98 moves in axial direction A1. The force imparted by load member 98 in axial direction A1 may at least partially cause translation of load member 113 in axial direction A1. The translation of load member 113 as load member 98 translates (e.g., following closure of gap G) may assist in providing a relatively continuous sliding pathway for stator disc 60 if stator disc 60 slides in axial direction A1 from load member 98 to load member 113 during compression of disc stack 52.

In some examples, load member 98 is configured to cause a load member 113 to displace toward central member 96 when load member 98 displaces toward central member 96 (e.g., following closure of gap G). This may mitigate and/or eliminate interferences to stator disc translation that might arise when load member 98 displaces toward central member 96 (e.g., in a direction opposite tangential direction T1) by an amount different from a displacement of load member 113 toward central member 96 (e.g., in the direction opposite tangential direction T1). The movement of load member 113 toward central member 96 as load member 98 moves toward central member 96 may assist in providing a relatively continuous sliding pathway for stator disc 60 if stator disc 60 slides in axial direction A1 from load member 98 to load member 113 during compression of disc stack 52. In examples, load member 98 is configured to drive load member 113 toward central member 96 when load member 98 moves toward central member 96.

For example, load member 98 may be configured to impart a force on load member 113 in a direction opposite tangential direction T1 when load member 98 contacts load member 113 (e.g., when gap G is closed) and load member 98 moves toward central member 96 in the direction opposite tangential direction T1. In some examples, load member 98 is configured to substantially trap at least some portion of load member 113 between load member 98 and central member 96 when load member 98 contacts load member 113 (e.g., when load member 98 has translated in axial direction A1 sufficient to close gap G). In some examples, member end 158 of load member 98 is configured to trap member end 160 of load member 113 between load member 98 and central member 96. Member end 158 may be configured to impart a force on member end 160 in the direction opposite tangential direction T1 when member end 158 contacts member end 160 (e.g., when gap G is closed) and load member 98 moves toward central member 96 in the direction opposite tangential direction T1.

In some examples, member end 158 is configured to substantially overhang member end 160. For example, a portion of member end 158 may be configured to extend in axial direction A1 beyond a portion of member end 160, such that is overlap between member ends 158, 160 in the axial direction. The portion of member end 158 may be configured to trap the portion of member end 160 between load member 98 and central member 96 when load member 98 translates in axial direction A1 sufficient to close gap G. The portion of member end 158 may be configured to contact and impart the force in the direction opposite tangential direction T1 on the portion of member end 160 when load member 98 translates in the direction opposite tangential direction T1 toward central member 96.

In some examples, first end structure 105 and/or second end structure 108 (FIGS. 5-7) defines a protrusion (e.g., a post) configured to insert into a recess defined by torque tube body 51 and/or a one or more components supported by torque tube body 51. For example, first end structure 105 may define a protrusion configured to insert into a recess 166 (FIG. 6) defined by key 152. Second end structure 108 may define a protrusion configured to insert into a recess 168 (FIG. 6) defined by torque tube body 51. In some examples, first end structure 105 and/or second end structure 108 defines a recess configured to receive a protrusion defined by torque tube body 51 and/or a one or more components supported by torque tube body 51.

Spline 64 may be configured to pivot (e.g., experience a rotation) about spline axis SA relative to torque tube body 51 when first end portion 102 and second end portion 104 (FIGS. 5-7) are supported by torque tube 50. Spline 64 may be configured to pivot about spline axis SA to assist in establishing a loading path for torque T and/or force F imparted by stator discs 60, 61, 62 and transferred to torque tube body 51. For example, spline 64 may be configured to pivot about spline axis SA such that load face 101 receives torque T and/or force F from stator discs 60, 61, 62 in a direction substantially normal to load face 101, or in a direction closer to normal than might be present in the absence of pivoting by spline 64. Receiving torque T and/or force F in a direction substantially normal or closer to normal to load face 101 may mitigate bending moments (e.g., substantially about spline axis SA) that might otherwise be imparted to load member 98, flex member 106, and/or central member 96 when load member receives torque T and/or force F from stator discs 60, 61, 62. Receiving torque T and/or force F in a direction substantially normal or closer to normal to load face 101 may reduce uneven load distribution and/or load peaks between the carbon material of stator discs 60, 61, 62 which bear against load face 101. In examples, spline 64 experiences a rotation of about 10 degrees or less when spline 64 pivots about spline axis SA to assist in establishing a loading path for torque T and/or force F.

In examples, first end portion 102 (e.g., first end structure 105) is configured to rotatably couple to torque tube body 51 and/or one or more components (e.g., key 152) supported by torque tube body 51. In examples, second end portion 104 (e.g., second end structure 108) is configured to rotatably couple to torque tube body 51 and/or one or more components supported by torque tube body 51. First end portion 102 and/or second end portion 104 may be configured to rotatably couple to torque tube body 51 and/or the one or more components such that load member 98, flex member 106, and/or central member 96 may pivot (e.g., experience a rotation) about spline axis SA relative to torque tube body 51.

In some examples, first end structure 105 and/or second end structure 108 is configured to establish a sliding fit with torque tube body 51 and/or one or more components (e.g., key 152) supported by torque tube body 51. For example, in some examples, a protrusion defined by first end structure 105 and/or second end structure 108 is configured to establish a sliding fit with a recess (e.g., recess 166, 168) defined by torque tube body 51 and/or the one or more components when the protrusion inserts into the recess. In some examples, a recess defined by first end structure 105 and/or second end structure 108 is configured to establish a sliding fit with a protrusion defined by torque tube body 51 and/or the one or more components when the recess receives the protrusion. First end structure 105 and/or second end structure 108 may be configured such that the sliding fit allows the protrusion or the recess to rotate relative to torque tube body 51 such that, for example, spline 64 may rotate about spline axis SA relative to torque tube body 51.

Figure 10:
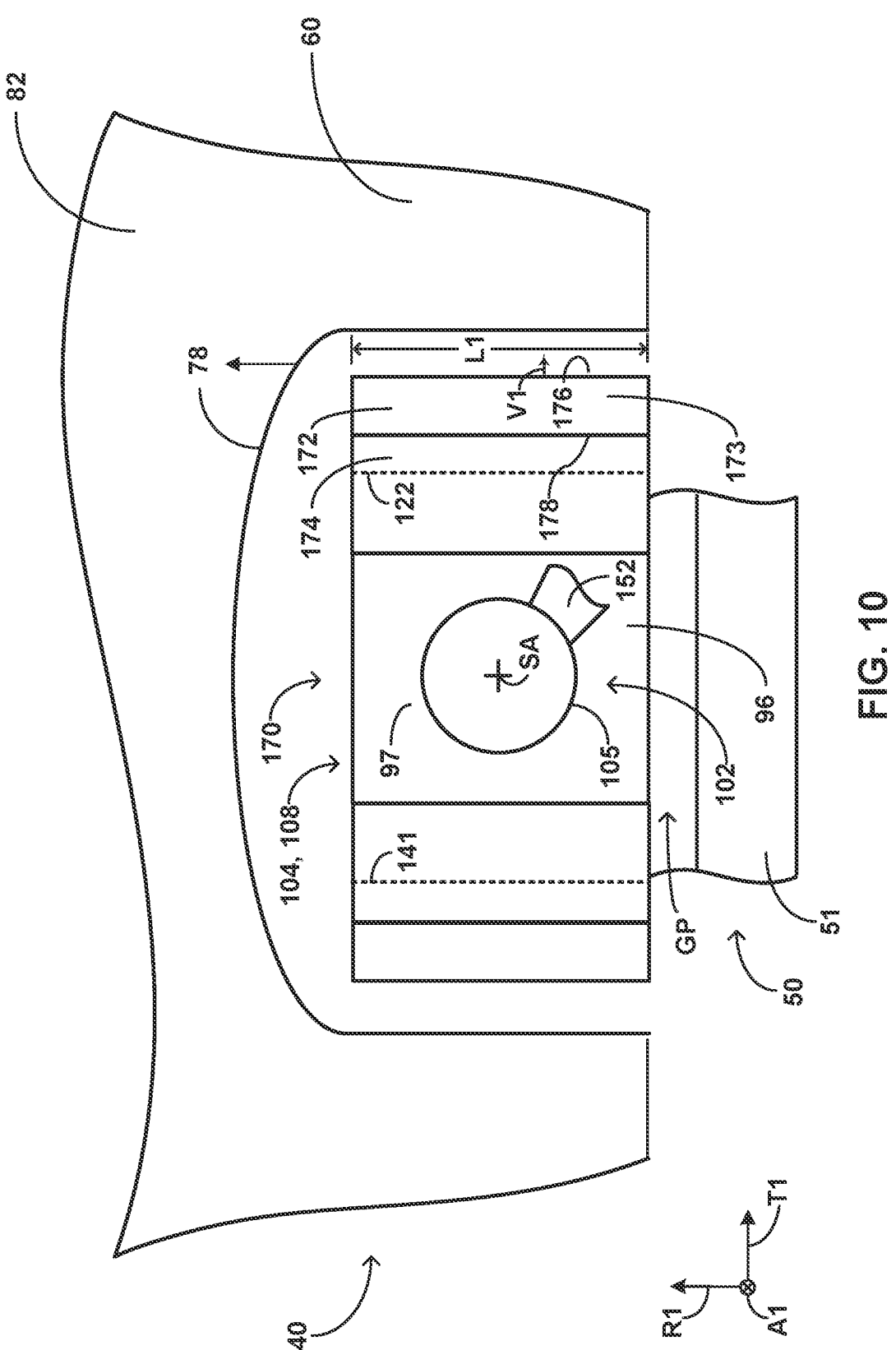
FIG. 10 is a schematic view of a spline including a first example load member.

FIG. 10 illustrates an end view of an example spline 170, a portion of stator disc 60, a portion of key 152, and a portion of torque tube 50 viewed in accordance with the A1-R1-T1 axes shown. In FIG. 10, axial direction A1 proceeds into the page. Spline 170 is depicted extending through stator slot 78 of stator disc 60 in axial direction A1. First end structure 105 is coupled to key 152. Second end structure 108 (hidden from view in FIG. 10 by central member body 97) is coupled to torque tube 50 (e.g., torque tube body 51). Central member body 97 defines support 122 and support 141, which are shown with dashed lines for clarity. In some examples, spline 170 may be configured such that central member body 97 is displaced from torque tube body 51 (e.g., by a gap GP) when first end portion 102 (e.g., first end structure 105) and/or second end portion 104 (e.g., second end structure 108) couples to torque tube 50. In examples, gap GP extends in radial direction R1.

Spline 170 includes load member 172 and flex member 174. Spline 170 in an example of spline 64. Load member 172 is an example of load member 96. Flex member 174 is an example of flex member 106.

Spline 170 includes a load face 176 defined by a body 173 of load member 172 ("load member body 173"). Load face 176 is an example of load face 101. Load member body 173 is an example of load member body 96. Spline 170 is configured to receive a torque and/or force (e.g., torque T and/or force F) from stator disc 60 via load face 176 when spline 170 extends through stator slot 78 and stator slot 78 engages (e.g., contacts) load face 176. In examples, load member 172 is configured to define load face 176 as a substantially flat surface. For example, load member 172 may define load face 176 as a substantially planar surface (e.g., planar or nearly planar to the extent permitted by manufacturing tolerances). In examples, load face 176 is a substantially planar surface substantially parallel to axial direction A1 (e.g., parallel or nearly parallel to the extent permitted by manufacturing tolerances). In some examples, load face 176 is substantially parallel to a A1-R1 plane defined by axial direction A1 and radial direction R1 (e.g., parallel or nearly parallel to the extent permitted by manufacturing tolerances). In some examples, load face 176 is configured such that a vector V1 normal to load face 101 is substantially parallel to tangential direction T1 when spline 170 couples to torque tube 50 (e.g., parallel or nearly parallel to the extent permitted by manufacturing tolerances). In some examples, load face 176 is configured such that an intersection of vector V1 and tangential direction T1 define a vertex angle (e.g., an acute vertex angle).

In examples, load member 172, flex member 174, and/or support 122 are configured such that load face 176 defines a fully supported surface. For example, load member body 173 may be configured such that load face 176 extends over a distance L1. The distance L1 may be defined in the R1-T1 plane when spline 170 couples to torque tube 50. Load face 176 may be substantially planar (e.g., planar or nearly planar to the extend permitted by manufacturing tolerances) at least over the distance L1. Flex member 174 is configured to extend at least over the distance L1, such that flex member 174 supports load member 172 (e.g., in the unloaded position) at least over the distance L1. In examples, support 122 is configured to extend at least over the distance L1, such that supports 122 receives torque T and/or force F from load member 172 (e.g., in the loaded position) at least over the distance L1. In examples, flex member 174 may be configured to transfer torque T and/or force F to support 122 at least over the distance L1 (e.g., when flex member 106 is in the loaded position).

The full support of load face 176 may cause stator disc 60 to impart a relatively uniform force distribution to load face 176 when load member 98 receives torque T and/or force F from stator disc 60. The relatively uniform force distribution may result in relatively uniform stresses imparted to load member 172 over the distance L1, potentially limiting and/or mitigating bending moments (e.g., substantially about spline axis SA) that might otherwise be imparted to load member 172 by stator disc 60.

The full support of load member 172 by flex member 174 and/or support member 122 may cause a transfer face 178 of load member 172 to impart a relatively uniform force distribution to flex member 174 and/or support 122 when load face 176 receives torque T and/or force F from stator disc 60. Transfer face 178 is an example of transfer face 103. The relatively uniform force distribution may result in relatively uniform stresses imparted to flex member 174 and/or support 122 over the distance L1, potentially limiting and/or mitigating bending moments (e.g., substantially about spline axis SA) that might otherwise be imparted to flex member 174 and/or support 122 by load member 172.

Figure 11:
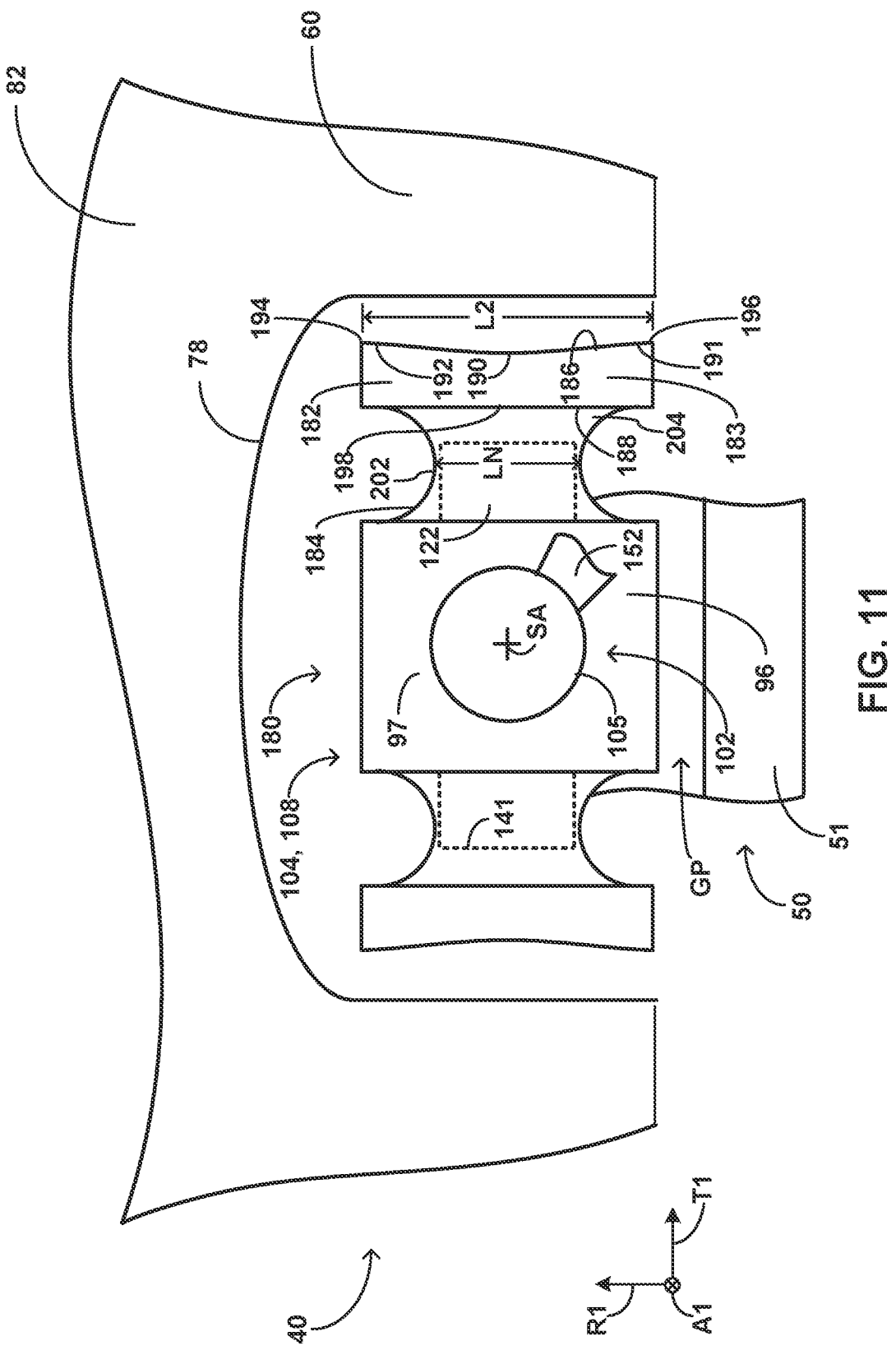
FIG. 11 is a schematic view of a spline including a second example load member.

FIG. 11 illustrates an end view of another example spline 180, a portion of stator disc 60, a portion of key 152, and a portion of torque tube 50 viewed in accordance with the A1-R1-T1 axes shown. In FIG. 10, axial direction A1 proceeds into the page. Spline 180 is depicted extending through stator slot 78 of stator disc 60 in axial direction A1. First end structure 105 is coupled to key 152. Second end structure 108 (hidden from view in FIG. 11 by central member body 97) is coupled to torque tube 50 (e.g., torque tube body 51). Central member body 97 defines support 122 and support 141, which are shown with dashed lines for clarity. Spline 180 may be configured such that central member body 97 is displaced from torque tube body 51 (e.g., by gap GP) when first end portion 102 and/or second end portion 104 couples to torque tube 50.

Spline 180 includes load member 182 and flex member 184. Spline 180 in an example of spline 64, 170. Load member 182 is an example of load member 96, 172. Flex member 184 is an example of flex member 106, 174.

Spline 180 includes a load face 186 defined by a body 183 of load member 182 ("load member body 183"). Load face 186 is an example of load face 101, 176. Load member body 183 is an example of load member body 96, 173. Spline 180 is configured to receive a torque and/or force (e.g., torque T and/or force F) from stator disc 60 via load face 186 when spline 170 extends through stator slot 78 and stator slot 78 engages (e.g., contacts) load face 186.

In the example of FIG. 11, spline 180 is configured such that load face 186 substantially deforms when stator disc 60 engages (e.g., contacts) load face 186 and imparts torque T and/or force F to load member 182 via load face 186. In some examples, load face 186 is configured to define a curvature (e.g., in the R1-T1 plane) when flex member 184 is in an unloaded position (e.g., when stator disc 60 is not imparting torque T and/or force F). Load member 182 (e.g., load member body 183) may be configured to deform to reduce the curvature when load face 186 receives torque T and/or force F from stator disc 60. The deformation of load member 182 may act to more effectively distribute a torque T and/or force F across load face 186 and/or stator surfaces which bear on and/or transfer the torque T and/or force F to load face 186.

In examples, load member 182 is configured such that load face 186 includes at least one of a concave portion 190 or a convex portion 192. In examples, concave portion 190 defines a negative curvature with respect to tangential direction T1 (e.g., in the T1-R1 plane). Convex portion 192 may define a positive curvature with respect to tangential direction T1 (e.g., in the T1-R1 plane). In examples, load member body 183 is configured such that concave portion 190 and/or convex portion 192 extend at least partially over a distance L2 defined by load face 176. The distance L2 may be defined in the R1-T1 plane when spline 180 couples to torque tube 50. In examples, load face 176 defines distance L2 between a first edge 194 and a second edge 196.

In examples, convex portion 192 extends from first edge 194 in a direction opposite radial direction R1. In examples, convex portion 192 and concave portion 190 define a contiguous surface of load face 186. For example, concave portion 190 may extend from convex portion 192 in the direction opposite radial direction R1. In some examples, load face 186 includes at second convex portion 191 defining a positive curvature with respect to tangential direction T1 (e.g., in the T1-R1 plane). In some examples, second convex portion 191 extends from second edge 196 in radial direction R1. Concave portion 190 may extend from second convex portion 191 in the radial direction R1. In some examples, load face 186 is configured such that concave portion 190 is between convex portion 192 and second convex portion 191. In some examples, convex portion 192, concave portion 190, and second convex portion 191 define a contiguous surface of load face 186. Convex portion 192, concave portion 190, and second convex portion 191 may define a contiguous surface extending from first edge 194 to second edge 196.

Flex member 184 may be configured to receive torque T and/or force F via a transfer face 188 defined by load member body 183. Transfer face 188 is an example of transfer face 103, 178. In examples, flex member 184 is configured to cause load member 182 to substantially channel torque T and/or force F through a load portion 198 of transfer face 188. In examples, load portion 198 is substantially opposite concave portion 190 (e.g., displaced from concave portion 190 in a direction opposite tangential direction T1). Substantially channeling torque T and/or force F through a load portion 198 may limit and/or mitigate bending moments (e.g., substantially about spline axis SA) that might otherwise be imparted to load member 182 by stator disc 60, and/or imparted to flex member 184 by load member 184.

For example, flex member 184 may be configured to define a distance LN less than distance L2. Distance LN may be defined in the R1-T1 plane when spline 180 couples to torque tube 50. In examples, flex member 184 defines distance LN in a neck portion 202 of flex member 184. Flex member 184 may be configured such that neck portion 202 is between load portion 198 and central member 96 (e.g., central member body 97). In examples, flex member 184 includes an outer portion 204 coupled to load member body 183 substantially over the distance L2. Flex member 184 may be configured to transition from outer portion 204 to neck portion 202 as flex member 184 extends toward central member 96 in a direction opposite tangential direction T1.

The transition of flex member 184 from outer portion 204 to neck portion 202 may cause load member 182 to substantially channel torque T and/or force F through load portion 198.

In some examples, spline 64 substantially defines a tapered shape as spline 64 extends in axial direction A1. For example, spline 64 may define a width (e.g., in the tangential direction T1) which narrows as spline 64 extends in axial direction A1. In examples, the width narrows as spline 64 extends in an outboard direction of brake assembly 40. Spline 64 may be configured such wider portions of spline 64 engage more inboard stator discs (e.g., stator disc 60) and narrower portions of spline 64 engage more outboard stator discs (e.g., stator disc 62). A greater width of spline 64 may assist in the disengagement of the more inboard discs with spline 64 when a braking operation is complete (e.g., when flex members of spline 64 return to an unloaded position).

Figure 12:
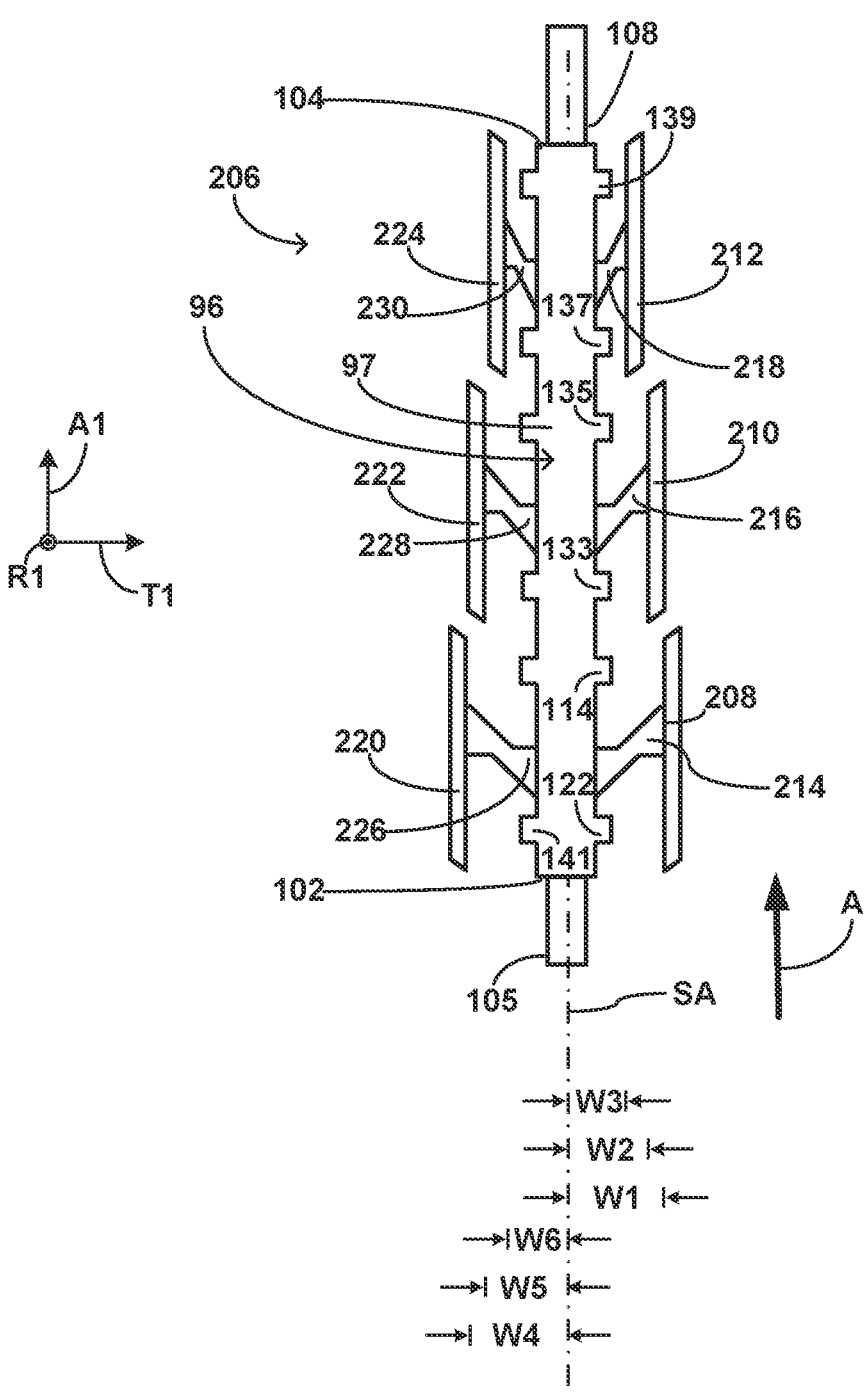
FIG. 12 is a schematic view of a spline defining a tapered profile.

For example, FIG. 12 illustrates a top view of an example tapering spline 206 viewed in accordance with the A1-R1-T1 axes shown. In FIG. 12, radial direction R1 proceeds out of the page. Spline 206 is an example of spline 64, 170, 180. Spline 206 is configured to define a first width W1 extending from spline axis SA to a load member 208, a second width W2 extending from spline axis SA to a load member 210, and/or a third width W3 extending from spline axis SA to a load member 212. Spline 206 is configured such that first width W1, second width W2, and/or third width W3 cause spline 206 to narrow as spline 206 extends in axial direction A1. For example, first width W1 may be greater than second width W2 and/or third width W3. Second width W2 may be greater than third width W3. In examples, first width W1, second width W2, and third width W3 are substantially parallel (e.g., parallel or nearly parallel to the extent permitted by manufacturing tolerances) to tangential direction T1. Load member 208 is an example of load member 98, 172, 182. Load member 210 is an example of load member 113, 172, 182. Load member 212 is an example of load member 115, 172, 182.

Spline 206 may include a flex member 214 extending from central member 96 to load member 208, a flex member 216 extending from central member 96 to load member 210, and/or a flex member 218 extending from central member 96 to load member 212. In examples, flex member 214 is configured to support load member 208 such that spline 206 defines first width W1 (e.g., when flex member 214 is in an unloaded position). Flex member 216 may be configured to support load member 210 such that spline 206 defines second width W2 (e.g., when flex member 216 is in an unloaded position). Flex member 218 may be configured to support load member 212 such that spline 206 defines third width W3 (e.g., when flex member 218 is in an unloaded position). Flex member 214 is an example of flex member 106, flex member 216 is an example of flex member 123, and flex member 216 is an example of flex member 125.

In some examples, spline 206 is configured to taper substantially symmetrically (e.g., symmetrically or nearly symmetrically to the extent permitted by manufacturing tolerances) with respect to spline axis SA. For example, load members 208, 210, 212 and flex members 214, 216, 218 may define a first tapering profile displaced from spline axis SA in tangential direction T1. Spline 206 may include a load member 220, a load member 222, and a load member 224 defining a second tapering profile displaced from spline axis SA in a direction opposite tangential direction T1. Load members 208, 210, 212, 220, 222, 224 may be configured such that spline 206 narrows as spline 206 extends in axial direction A1.

For example, spline 206 may define a fourth width W4 extending from spline axis SA to load member 220, a fifth width W5 extending from spline axis SA to a load member 222, and/or a sixth width W6 extending from spline axis SA to load member 224. Fourth width W4, fifth width W5, and/or sixth width W6 may cause spline 206 to narrow as spline 206 extends in axial direction A1. For example, fourth width W4 may be greater than fifth width W5 and/or sixth width W6 (and, e.g., greater than second width W2 and/or third width W3). Fifth width W5 may be greater than sixth width W6 (and, e.g., greater than third width W3). In examples, fourth width W4, fifth width W5, and sixth width W6 are substantially parallel (e.g., parallel or nearly parallel to the extent permitted by manufacturing tolerances) to the tangential direction T1. Load member 220 is an example of load member 117, 172, 182. Load member 222 is an example of load member 119, 172, 182. Load member 224 is an example of load member 121, 172, 182.

In some examples, load members 208, 210, 212 define a substantially linear taper, such that a difference between first width W1 and second width W2 is substantially the same as a difference between second width W2 and third width W3. In some examples, load members 208, 210, 212 define a substantially nonlinear taper, such that, for example, the difference between first width W1 and second width W2 is substantially greater than or less than the difference between second width W2 and third width W3. In some examples, load members 220, 222, 224 define a substantially linear taper, such that a difference between fourth width W4 and fifth width W5 is substantially the same as a difference between fifth width W5 and sixth width W6. In some examples, load members 220, 222, 224 define a substantially nonlinear taper, such that, for example, the difference between fourth width W4 and fifth width W5 is substantially greater than or less than the difference between fifth width W5 and sixth width W6.

In examples, spline 206 includes a flex member 226 extending from central member 96 to load member 220, a flex member 228 extending from central member 96 to load member 222, and/or a flex member 230 extending from central member 96 to load member 224. In examples, flex member 226 is configured to support load member 220 such that spline 206 defines fourth width W4 (e.g., when flex member 226 is in an unloaded position). Flex member 228 may be configured to support load member 222 such that spline 206 defines fifth width W5 (e.g., when flex member 228 is in an unloaded position). Flex member 230 may be configured to support load member 224 such that spline 206 defines sixth width W6 (e.g., when flex member 230 is in an unloaded position). Flex member 226 is an example of flex member 127, flex member 228 is an example of flex member 129, and flex member 230 is an example of flex member 131.

Spline 63, 64, 88, 90, 92, 94, 170, 180, 206 ("spline 63-206"), torque tube 50, stator disc 60, 61, 62, rotor disc 54, 55, 56, 57, other components of brake assembly 40, wheel 10, and the components thereof, may be made from any suitable material. For example, the material may be any material of suitable strength for the intended use of splines 63-206, torque tube 50, stator disc 60, 61, 62, rotor disc 54, 55, 56, 57, other components of brake assembly 40, wheel 10, and the components thereof. In some examples, the material includes a metal or a metal alloy. Spline 63-206, torque tube 50, stator disc 60, 61, 62, rotor disc 54, 55, 56, 57, other components of brake assembly 40, wheel 10, and the components thereof, can be formed using any suitable technique. Spline 63-206, torque tube 50, stator disc 60, 61, 62, rotor disc 54, 55, 56, 57, other components of brake assembly 40, wheel 10, and the components thereof, may be forged, casted, made from bar stock, additive manufactured (e.g., three-dimensionally (3D) printed), extruded, drawn, or be produced using other suitable methods. In some examples, spline 63-206, torque tube 50, stator disc 60, 61, 62, rotor disc 54, 55, 56, 57, other components of brake assembly 40, wheel 10, and the components thereof, may be machined to define the configurations described herein. In other examples, spline 63-206, torque tube 50, stator disc 60, 61, 62, rotor disc 54, 55, 56, 57, other components of brake assembly 40, wheel 10, and the components thereof, may be formed without having to be substantially machined.

Wheel 10 may be finish machined from a near-net-shaped aluminum forging and contain an axial assembly and/or wheel rim for assembly of brake assembly 40 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including stator discs 60, 61, 62 and rotor discs 54, 55, 56, 57, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven configuration as either a single layer or multilayer structure.

Figure 13:
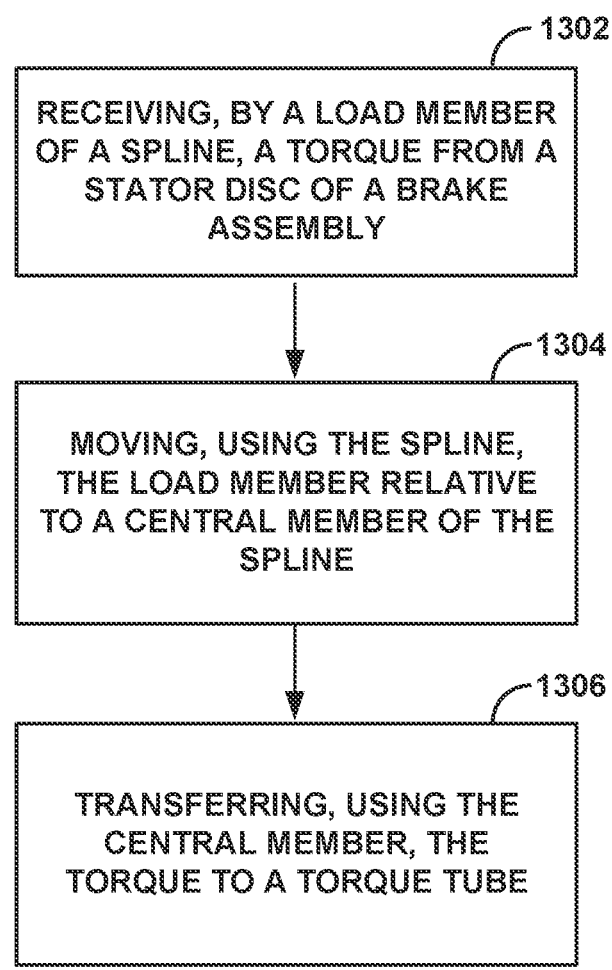
FIG. 13 is a flow diagram illustrating an example method of transferring a torque to a torque tube using a spline.

FIG. 13 illustrates a flow diagram of an example technique for transferring a torque from a spline to a torque tube. Although the technique is mainly described with reference brake assembly 40 and the components thereof (FIGS. 2-11), the technique may be used with other brake assemblies in other examples. The technique below may be used with a spline 63-206 including a load member 98, 113, 115, 117, 119, 121, 172, 182, 208, 210, 212, 220, 222, and/or 224 ("load member 98-224"), and/or a flex member 106, 123, 125, 127, 129, 131, 174, 184, 214, 216, 218, 226, 228, and/or 230 ("flex member 106-230").

The technique includes receiving, by load member 98-224 of spline 63-206, a torque T and/or force F from stator discs 60, 61, 62 of a brake assembly 40 (1302). In examples, stator discs 60, 61, 62 engage rotor discs 54, 55, 56, 57 and generate braking torque (e.g., a torque T1 or a torque T2). Stator disc 60, 61, 62 may transmit at least some portion of the braking torque to spline 63-206 when stator disc 60, 61, 62 imparts torque T and/or force F to load member 98, 172, 182. In examples, an actuator 66 may impart an actuator force FA on a disc stack 52 which includes stator discs 60, 61, 62 and rotor discs 54, 55, 56, 57 to cause stator discs 60, 61, 62 to engage rotor discs 54, 55, 56, 57.

Spline 63-206 are configured to limit a rotation of stator discs 60, 61, 62 about an axis AR of a wheel 10 when stator discs 60, 61, 62 impart torque T and/or force F to load member 98, 172, 182. In examples, spline 63-206 pivots about a spline axis SA extending from a first end portion 102 of spline 63-206 to a second end portion 104 of spline 63-206 when load member 98-224 receives torque T and/or force F. Spline 64 may pivot about spline axis SA to establish a loading path such that load face 101 receives torque T and/or force F in a direction substantially normal to load face 101 or in a direction closer to normal than might be present in the absence of pivoting by spline 64.

In examples, the technique includes moving, using spline 63-206, load member 98-224 relative to a central member 96 of spline 63-206 (1304). Spline 60, 62, 62 may impart a force FS1 and/or force F1 on load member 98-224 to cause the movement of load member 98-224 (e.g., when stator discs 60, 61, 62 impart torque T and/or force F to load member 98-224). In examples, load member 98-224 moves in an axial direction A1 of spline 63-206 relative to central member 96. In examples, load member 98-224 moves in a tangential direction T1 of spline 63-206 or in a direction opposite tangential direction T1 relative to central member 96.

Load member 98-224 may deform (e.g., bend and/or flex) flex member 106-230 when load member 98-224 moves relative to central member 96. In examples, flex member 106-230 deforms in axial direction A1 and/or tangential direction T1 or the direction opposite tangential direction T1. In examples, load member 98-224 imparts a first force F1 and/or a third force F3 on a second flex member end 111 and central member 96 imparts a second force F2 and/or fourth force F4 on first flex member end 109 to cause flex member 106-230 to deform. In examples, flex member 106-230 deforms substantially elastically when first force F1, second force F2, third force F3, and/or fourth force F4 causes the deformation of flex member 106-230.

The technique includes transferring, using load member 98-224, torque T and/or force F to central member 96 of spline 63-206 (1306). In examples, load member 98-224 transitions from an unloaded position to a loaded position when load member 98-224, torque T and/or force F to central member 96. In examples, load member 98-224 transfers torque T and/or force F to a support 114, 122, 133, 135, 137, 141 or another support of central member 96.

Central member 96 (e.g., central member body 97) may transfer torque T and/or force F to a torque tube 50 of brake assembly 40. In examples, central member 96 transfers torque T and/or force F to a torque tube 50 using first end portion 102 coupled to torque tube 50 and/or second end portion 104 coupled to torque tube 50. In some examples, central member 96 transfers torque T and/or force F to a torque tube body 51 of torque tube 50. In some examples, central member 96 transfers torque T and/or force F to one or more other components (e.g., a key 152), and the one or more other components of transfer torque T and/or force F to torque tube body 51.

In examples, the technique includes transitioning, using flex member 106-230, load member 98-224 from the loaded position to the unloaded position. In examples, flex member 106-230 transitions load member 98-224 from the loaded position to the unloaded position when stator discs 60, 61, 62 cease to impart torque T and/or force F on load member 98-224. In examples, stator discs 60, 61, 62 cease to impart torque T and/or force F on load member 98-224 when actuator 66 substantially ceases to exert actuator force FA on disc stack 52.

In some examples, the technique includes positioning torque tube 50 (e.g., torque tube body 51) through an aperture 72 defined by a stator disc 60, 61, 62. Positioning torque tube 50 through aperture 72 may include positioning spline 63-206 in a stator slot 78, 80, 89, 91, 92, 95 of stator disc 60, 61, 62. In examples, the technique includes positioning torque tube 50 through one or more apertures defined by rotor disc 54, 55, 56, 57. One or more of rotor discs 54, 55, 56, 57 may interleave with one or more of stator disc 60, 62, 62 when torque tube 50 positions through the one or more apertures.

In examples, positioning torque tube 50 through aperture 72 includes moving stator disc 60, 61, 62 relative to torque tube body 51 in an axial direction of torque tube 50 (along axis A). In examples, positioning spline 63-206 in a stator slot 78, 80, 89, 91, 92, 95 includes moving stator disc 60, 61, 62 over spline 63-206 axially along torque tube body 51. In some examples, positioning torque tube 50 through aperture 72 includes attaching stator insert 86 to one or more of stator slot 78, 80, 89, 91, 92, 95 prior to positioning torque tube 50 through aperture 72.

The present disclosure includes the following examples.

Example 1: An assembly comprising: a spline configured to receive a torque from a stator disc of a brake assembly to limit rotational movement of the stator disc around a wheel axis defining an axial direction, the spline comprising: a central member defining a first end, a second end opposite the first end, and a spline axis extending from the first end to the second end, wherein the spline axis extends in the axial direction when the central member is supported by a torque tube of the brake assembly; and a load member configured to receive the torque, wherein the load member is configured to move relative to the central member in a movement direction along the spline axis when the load member receives the torque, and wherein the load member is configured to transfer the torque to the central member.

Example 2: The assembly of example 1, further comprising a flex member extending from the central member to the load member, wherein the flex member is configured to deform when the load member moves relative to the central member.

Example 3: The assembly of example 1 or example 2, wherein the flex member includes a first flex member end coupled to the central member and a second flex member end coupled to the load member, and wherein the flex member is configured to displace the second flex member end from the first flex member end in the movement direction when the load member moves relative to the central member.

Example 4: The assembly of example 3, wherein the flex member defines a flex member axis extending from the first flex member end to the second flex member end, wherein the flex member axis and the spline axis define an angle of less than 90 degrees.

Example 5: The assembly of any of examples 2-4, wherein the central member includes a support extending from a surface of the central member, wherein the load member is configured to transfer the torque to the support, and wherein the support is configured to limit the deformation of the flex member when the load member moves relative to the central member.

Example 6: The assembly of any of examples 1-5, wherein the load member is a first load member and the spline further comprises a second load member, and wherein the first load member is displaced from the second load member in the axial direction.

Example 7: The assembly of any of examples 1-6, wherein the load member is configured to move toward the central member when the load member moves relative to the central member.

Example 8: The assembly of any of examples 1-7, wherein the spline is configured to pivot about the spline axis relative to a body of the torque tube when the first and second ends are supported by the torque tube and the spline receives the torque.

Example 9: The assembly of any of examples 1-8, wherein the load member is configured to establish an unloaded position relative to the central member in the absence of the load member receiving the torque and establish a loaded position relative to the central member when the load member receives the torque, and wherein the spline is configured to move the load member from the loaded position to the unloaded position when the load member ceases to receive the torque.

Example 10: The assembly of any of examples 1-9, wherein a body of the load member defines a load face configured to contact the stator disc, and wherein the load face defines a concave surface.

Example 11: The assembly of any of examples 1-10, further comprising a key configured to engage the torque tube and configured to engage one of the first end or the second end, wherein the key is configured to transfer the torque from the central member to the torque tube when the key engages the torque tube and engages the one of the first end or the second end.

Example 12: The assembly of example 11, wherein the key is configured to rotatably engage the one of the first end or the second end.

Example 13: The assembly of any of examples 1-12, further comprising the torque tube coupled to the central member, wherein the load member is configured to move relative to the torque tube when the load member translates relative to the central member and the central member is coupled to the torque tube, and wherein the central member is configured to transfer the torque to a body of the torque tube.

Example 14: The assembly of any of examples 1-13, further comprising: a disc stack including a plurality of stator discs, the plurality of stator discs including the stator disc, wherein the spline is configured to receive the torque from the plurality of stator discs; and an actuator configured to compress the disc stack to cause the plurality of stator discs to impart the torque to the spline.

Example 15: The assembly of example 14, wherein: the actuator is configured to translate the plurality of stator discs in the axial direction when the actuator compresses the disc stack, the disc stack includes a plurality of rotor discs interleaved with the plurality of stator discs, the plurality of stator discs are configured to engage the plurality of rotor discs when the actuator compresses the disc stack, and the plurality of stator discs are configured to impart the torque to the spline when the plurality of stator discs engage the plurality of rotor discs.

Example 16: An assembly comprising: a disc stack including a plurality of stator discs interleaved with a plurality of rotor discs, wherein the plurality of rotor discs are configured to rotate around a wheel axis defining an axial direction; a torque tube configured to extend through a central aperture defined by the disc stack; an actuator configured to translate at least the plurality of stator discs in the axial direction when the actuator compresses the disc stack, wherein the plurality of stator discs are configured to engage the plurality of rotor discs when the actuator compresses the disc stack; and a spline configured to receive a torque from the plurality of stator discs when the plurality of stator discs engage the plurality of rotor discs, the spline comprising: a central member coupled to body of the torque tube; a load member; and a flex member between the load member and the control member, wherein the load member is configured to receive the torque, wherein the load member is configured to move relative to the central member in the axial direction when the load member receives the torque, wherein the flex member is configured to deform when the load member moves relative to the central member, and wherein the load member is configured to transfer the torque to the central member.

Example 17: The assembly of example 16, wherein the load member is a first load member configured to receive a first portion of the torque and further comprising a second load member configured to receive a second portion of the torque, wherein the flex member is a first flex member and further comprising a second load member between the second load member and the central member, and wherein the first load member is configured to move relative to the central member by a first amount when the first load member receives the first portion of the torque and the second load member is configured to move relative to the central member by a second amount different from the first amount when the second load member receives the second portion of the torque.

Example 18: The assembly of example 16 or example 17, wherein the first flex member is configured to displace the first load member from the central member by a first width, and wherein the second flex member is configured to displace the second load member from the central member by a second width different from the first width, wherein the first width and the second width are substantially perpendicular to the axial direction.

Example 19: A method, comprising: receiving, by a load member of a spline, a torque from a stator disc of a brake assembly, wherein the spline is configured to limit rotational movement of the stator disc around a wheel axis defining an axial direction, the spline comprising: a central member defining a first end, a second end opposite the first end, and a spline axis extending from the first end to the second end, wherein the spline axis extends in the axial direction, and the load member; moving, using the spline, the load member relative to the central member in a movement direction along the spline axis when the load member receives the torque; and transferring, using the load member, the torque to the central member, wherein the central member is configured to couple to a torque tube of the brake assembly.

Example 20: The method of example 19, further comprising: engaging, using an actuator of the brake assembly, a plurality of stator discs and a plurality of rotor discs interleaved with a plurality of rotor discs, wherein the plurality of stator discs include the stator disc; generating, using the plurality of stator discs, the torque when the a plurality of stator discs engage the plurality of rotor discs; and imparting, using the plurality of stator discs, the torque to the load member.

Various examples have been described. These and other examples are within the scope of the following claims.

What is claimed is:

1. An assembly comprising:

a spline configured to receive a torque from a stator disc of a brake assembly to limit rotational movement of the stator disc around a wheel axis defining an axial direction, the spline comprising:

a central member defining a first end, a second end opposite the first end, and a spline axis extending from the first end to the second end, wherein the spline axis extends in the axial direction when the central member is supported by a torque tube of the brake assembly; and a load member configured to receive the torque, wherein the load member is configured to move relative to the central member in a movement direction along the spline axis when the load member receives the torque, and wherein the load member is configured to transfer the torque to the central member.

2. The assembly of claim 1, further comprising a flex member extending from the central member to the load member, wherein the flex member is configured to deform when the load member moves relative to the central member.

3. The assembly of claim 2, wherein the flex member includes a first flex member end coupled to the central member and a second flex member end coupled to the load member, and wherein the flex member is configured to displace the second flex member end from the first flex member end in the movement direction when the load member moves relative to the central member.

4. The assembly of claim 3, wherein the flex member defines a flex member axis extending from the first flex member end to the second flex member end, wherein the flex member axis and the spline axis define an angle of less than 90 degrees.

5. The assembly of claim 2, wherein the central member includes a support extending from a surface of the central member, wherein the load member is configured to transfer the torque to the support, and wherein the support is configured to limit the deformation of the flex member when the load member moves relative to the central member.

6. The assembly of claim 1, wherein the load member is a first load member and the spline further comprises a second load member, and wherein the first load member is displaced from the second load member in the axial direction.

7. The assembly of claim 1, wherein the load member is configured to move toward the central member when the load member moves relative to the central member.

8. The assembly of claim 1, wherein the spline is configured to pivot about the spline axis relative to a body of the torque tube when the first and second ends are supported by the torque tube and the spline receives the torque.

9. The assembly of claim 1, wherein the load member is configured to establish an unloaded position relative to the central member in the absence of the load member receiving the torque and establish a loaded position relative to the central member when the load member receives the torque, and wherein the spline is configured to move the load member from the loaded position to the unloaded position when the load member ceases to receive the torque.

10. The assembly of claim 1, wherein a body of the load member defines a load face configured to contact the stator disc, and wherein the load face defines a concave surface.

11. The assembly of claim 1, further comprising a key configured to engage the torque tube and configured to engage one of the first end or the second end, wherein the key is configured to transfer the torque from the central member to the torque tube when the key engages the torque tube and engages the one of the first end or the second end.

12. The assembly of claim 11, wherein the key is configured to rotatably engage the one of the first end or the second end.

13. The assembly of claim 1, further comprising the torque tube coupled to the central member, wherein the load member is configured to move relative to the torque tube when the load member translates relative to the central member and the central member is coupled to the torque tube, and wherein the central member is configured to transfer the torque to a body of the torque tube.

14. The assembly of claim 1, further comprising:

a disc stack including a plurality of stator discs, the plurality of stator discs including the stator disc, wherein the spline is configured to receive the torque from the plurality of stator discs; and an actuator configured to compress the disc stack to cause the plurality of stator discs to impart the torque to the spline.

15. The assembly of claim 14, wherein:

the actuator is configured to translate the plurality of stator discs in the axial direction when the actuator compresses the disc stack, the disc stack includes a plurality of rotor discs interleaved with the plurality of stator discs, the plurality of stator discs are configured to engage the plurality of rotor discs when the actuator compresses the disc stack, and the plurality of stator discs are configured to impart the torque to the spline when the plurality of stator discs engage the plurality of rotor discs.

16. An assembly comprising:

a disc stack including a plurality of stator discs interleaved with a plurality of rotor discs, wherein the plurality of rotor discs are configured to rotate around a wheel axis defining an axial direction;

a torque tube configured to extend through a central aperture defined by the disc stack;

an actuator configured to translate at least the plurality of stator discs in the axial direction when the actuator compresses the disc stack, wherein the plurality of stator discs are configured to engage the plurality of rotor discs when the actuator compresses the disc stack; and a spline configured to receive a torque from the plurality of stator discs when the plurality of stator discs engage the plurality of rotor discs, the spline comprising:

a central member coupled to body of the torque tube;

a load member; and a flex member between the load member and the control member, wherein the load member is configured to receive the torque, wherein the load member is configured to move relative to the central member in the axial direction when the load member receives the torque, wherein the flex member is configured to deform when the load member moves relative to the central member, and wherein the load member is configured to transfer the torque to the central member.

17. The assembly of claim 16, wherein the load member is a first load member configured to receive a first portion of the torque and further comprising a second load member configured to receive a second portion of the torque, wherein the flex member is a first flex member and further comprising a second load member between the second load member and the central member, and wherein the first load member is configured to move relative to the central member by a first amount when the first load member receives the first portion of the torque and the second load member is configured to move relative to the central member by a second amount different from the first amount when the second load member receives the second portion of the torque.

18. The assembly of claim 16, wherein the first flex member is configured to displace the first load member from the central member by a first width, and wherein the second flex member is configured to displace the second load member from the central member by a second width different from the first width, wherein the first width and the second width are substantially perpendicular to the axial direction.

19. A method, comprising:

receiving, by a load member of a spline, a torque from a stator disc of a brake assembly, wherein the spline is configured to limit rotational movement of the stator disc around a wheel axis defining an axial direction, the spline comprising:

a central member defining a first end, a second end opposite the first end, and a spline axis extending from the first end to the second end, wherein the spline axis extends in the axial direction, and the load member;

moving, using the spline, the load member relative to the central member in a movement direction along the spline axis when the load member receives the torque; and transferring, using the load member, the torque to the central member, wherein the central member is configured to couple to a torque tube of the brake assembly.

20. The method of claim 19, further comprising:

engaging, using an actuator of the brake assembly, a plurality of stator discs and a plurality of rotor discs interleaved with a plurality of rotor discs, wherein the plurality of stator discs include the stator disc;

generating, using the plurality of stator discs, the torque when the a plurality of stator discs engage the plurality of rotor discs; and imparting, using the plurality of stator discs, the torque to the load member.

* * * * *